(12) United States Patent
Spratt et al.

(10) Patent No.: US 10,782,541 B2
(45) Date of Patent: *Sep. 22, 2020

(54) METHOD FOR DESIGNING A LENS SHAPE AND SPECTACLE LENS

(71) Applicant: Carl Zeiss Vision International GmbH, Aalen (DE)

(72) Inventors: Ray Steven Spratt, Petaluma, CA (US); Philipp Ellinger, Hallet Cove (AU); Helmut Wietschorke, Aalen (DE); Angela Nolan, Black Forrest (AU); Saulius Varnas, Brighton (AU)

(73) Assignee: Carl Zeiss Vision International GmbH, Aalen (DE)

( * ) Notice: Subject to any disclaimer, the term of this patent is extended or adjusted under 35 U.S.C. 154(b) by 285 days.

This patent is subject to a terminal disclaimer.

(21) Appl. No.: 15/056,792

(22) Filed: Feb. 29, 2016

(65) Prior Publication Data
US 2017/0146818 A1 May 25, 2017

Related U.S. Application Data

(60) Provisional application No. 62/258,919, filed on Nov. 23, 2015.

(51) Int. Cl.
*G02C 7/02* (2006.01)
*G02C 7/06* (2006.01)

(52) U.S. Cl.
CPC ............ *G02C 7/028* (2013.01); *G02C 7/027* (2013.01); *G02C 7/063* (2013.01); *G02C 2202/04* (2013.01)

(58) Field of Classification Search
CPC ........ G02C 7/027; G02C 7/028; G02C 7/063; G02C 7/06; G02C 7/061; G02C 7/065;
(Continued)

(56) References Cited

U.S. PATENT DOCUMENTS 4,561,736 A 12/1985 Fuerter et al.
4,861,153 A 8/1989 Winthrop
(Continued)

FOREIGN PATENT DOCUMENTS

CA 2891988 A1 11/2015
CN 101946203 A 1/2011
(Continued)

OTHER PUBLICATIONS

The Fourier transform of spline-function approximations to continuous data, L. Ostrander, IEEE Transactions on Audio and Electroacoustics ( vol. 19, Issue: 1, Mar. 1971 ).*
(Continued)

*Primary Examiner* — Travis S Fissel
(74) *Attorney, Agent, or Firm* — Thrive IP®; George M. Hasselmann

(57) ABSTRACT

The current invention is directed to a computer-implemented method for providing a lens shape for an ophthalmic lens. Further, there is provided a method for angular smoothing of a surface determined by carrier lines radially outwards of a prescription zone bordered by a first boundary line. Further, there is provided an ophthalmic lens, in particular a spectacle lens. Further, a method for minimizing the difference in thickness between two ophthalmic lenses for the same spectacles. A computer program product and a machine readable storage medium are provided as well.

39 Claims, 12 Drawing Sheets

(58) Field of Classification Search
CPC ........ G02C 7/066; G02C 7/068; G02C 7/024; G02C 7/022
USPC ............ 351/159.39–159.42, 159.47, 159.52, 351/159.64, 159.73–159.77
See application file for complete search history.

(56) References Cited

U.S. PATENT DOCUMENTS

| | | | |
|---|---|---|---|
| 6,241,355 B1* | 6/2001 | Barsky | G02C 7/021 351/159.74 |
| 6,361,166 B1 | 3/2002 | Perrott et al. | |
| 7,070,274 B2 | 7/2006 | Kamishita et al. | |
| 7,445,333 B2 | 11/2008 | Shirayanagi et al. | |
| 7,527,376 B2 | 5/2009 | Kamishita et al. | |
| 7,857,451 B2 | 12/2010 | Thibos et al. | |
| 8,002,404 B2 | 8/2011 | Weatherby | |
| 8,118,425 B2 | 2/2012 | Esser et al. | |
| 8,205,987 B2 | 6/2012 | Meister et al. | |
| 8,308,294 B2 | 11/2012 | Dubois et al. | |
| 8,449,111 B2 | 5/2013 | Weatherby | |
| 8,523,633 B2 | 9/2013 | Schneider et al. | |
| 8,805,612 B2 | 8/2014 | Becken et al. | |
| 8,814,353 B2 | 8/2014 | Kozu et al. | |
| 9,459,467 B2 | 10/2016 | Estepa et al. | |
| 9,778,486 B2 | 10/2017 | Kozu et al. | |
| 2004/0114104 A1* | 6/2004 | Welk | G02C 7/027 351/159.42 |
| 2004/0233382 A1 | 11/2004 | Lindacher et al. | |
| 2005/0110946 A1 | 5/2005 | Youssefi et al. | |
| 2005/0206840 A1 | 9/2005 | Roscini | |
| 2005/0225719 A1 | 10/2005 | Kamishita et al. | |
| 2006/0274258 A1 | 12/2006 | Shirayanagi et al. | |
| 2007/0008488 A1 | 1/2007 | Esser et al. | |
| 2007/0052920 A1 | 3/2007 | Stewart et al. | |
| 2008/0024719 A1 | 1/2008 | Kamishita et al. | |
| 2008/0055545 A1* | 3/2008 | Clamp | G02C 7/028 351/159.02 |
| 2008/0100800 A1 | 5/2008 | Guillen et al. | |
| 2008/0231800 A1 | 9/2008 | Esser et al. | |
| 2008/0284978 A1 | 11/2008 | Kaga | |
| 2009/0015787 A1 | 1/2009 | Guillen et al. | |
| 2009/0244480 A1 | 10/2009 | De Gaudemaris et al. | |
| 2010/0026954 A1* | 2/2010 | Kozu | G02C 7/061 351/159.42 |
| 2010/0097569 A1* | 4/2010 | Weeber | A61F 2/1618 351/159.44 |
| 2010/0296048 A1 | 11/2010 | Weatherby | |
| 2011/0134388 A1 | 6/2011 | Hsu | |
| 2012/0008089 A1 | 1/2012 | Kozu et al. | |
| 2012/0013846 A1 | 1/2012 | Duersteler Loepez et al. | |
| 2012/0069297 A1 | 3/2012 | Cabeza et al. | |
| 2013/0107205 A1 | 5/2013 | Weatherby | |
| 2014/0111763 A1 | 4/2014 | Griffin | |
| 2015/0276987 A1 | 10/2015 | McKenzie et al. | |
| 2015/0338680 A1* | 11/2015 | Spratt | G02C 7/024 351/159.76 |
| 2017/0017095 A1 | 1/2017 | Fricker et al. | |

FOREIGN PATENT DOCUMENTS

| | | |
|---|---|---|
| CN | 102422201 A | 4/2012 |
| CN | 102422201 B | 5/2013 |
| CN | 104094165 A | 10/2014 |
| CN | 106104364 A | 11/2016 |
| CN | 108351533 B | 6/2019 |
| EP | 2117774 A1 | 11/2009 |
| EP | 1963908 B1 | 9/2012 |
| ES | 2427859 A1 | 11/2013 |
| WO | 97/35224 A1 | 9/1997 |
| WO | 03/050596 A1 | 6/2003 |
| WO | 03/092485 A1 | 11/2003 |
| WO | 2004/029694 A1 | 4/2004 |
| WO | 2008/135178 A1 | 11/2008 |
| WO | 2014/060552 A1 | 4/2014 |
| WO | 2014128033 A1 | 8/2014 |

OTHER PUBLICATIONS

International Search Report and Written Opinion dated Mar. 10, 2017 from the corresponding international patent application PCT/EP2016/078155.
DIN EN ISO 13666: 1998-11 of the DIN Deutschen Institut fuer Normung, e.V., pp. 1 to 51.
Written Opinion and International Search Report dated Feb. 4, 2015 in international patent application PCT/US2014/039185.
Extended Search Report of the European Patent Office dated Sep. 23, 2015 in European patent application 15168335.6-1562.
Brooks, C. W. et al, "System for ophthalmic dispensing", ISBN-13: 978-0-7506-7480-5, Third Edition, Butterworth-Heineman / Elsevier, 2007, in particular pp. 425 to 429.
Gross, H. et al, "Handbook of Optical Systems", vol. 1 to 5, WILEY-VCH Publishing, Wein-heim, 2007, ISBN: 978-3-527-40382-0, in particular in vol. 3—Aberration Theory and Correction of Optical Systems, in particular its chapters 32 "Principles of Optimization", 33 "Optimization process" and 34 "Special Correction Features" pp. 298 to 593.
Shannon, R.R., "The Art and Science of Optical Design", Cambridge University Press, 1997, ISBN 0-521-58868-5, in particular its chapter 5 "Design optimization", pp. 334 to 355.
European search report dated Nov. 14, 2018 from the corresponding European patent application 18179632.7-1020.
First Office action and English translation of the Office action of the Chinese Patent Office dated Sep. 25, 2018 in corresponding Chinese patent application 201680068384.8.
Office action and English translation of the Office action of the Chinese Patent Office dated Apr. 30, 2019 in corresponding Chinese patent application 201810722997.X.
Office action by the Chinese Patent Office issued in CN 201810722997.X, which is another counterpart hereof, dated Dec. 11, 2019, and English-language translation thereof.
Office action by the Canadian Patent Office issued in CA 3,018,239, which is a counterpart hereof, dated Mar. 4, 2020.
Office action by the Brazilian Patent Office issued in BR112018009816-7, which is a counterpart hereof, dated May 1, 2020.
Office action by the Indian Patent Office issued in IN201817019149, which is a counterpart hereof, dated Jul. 2, 2020.

* cited by examiner

METHOD FOR DESIGNING A LENS SHAPE AND SPECTACLE LENS

CROSS-REFERENCE TO RELATED APPLICATIONS

This application claims the priority of U.S. provisional patent application No. 62/258,919, filed Nov. 23, 2015.

BACKGROUND OF THE INVENTION

The current invention is directed towards a computer-implemented method for providing a lens shape for an ophthalmic lens; a method for angular smoothing of a surface determined by carrier lines radially outwards of a prescription zone bordered by a first boundary line; a method for manufacturing an ophthalmic lens; an uncut finished spectacle lens for manufacturing an ophthalmic lens, in particular a spectacle lens, a computer program product and a machine readable storage medium.

In recent years, the number of so-called individually designed spectacle lenses has been significantly increasing. These individually designed spectacle lenses take into account a number of individual parameters of an intended wearer. This leads towards more and more lenses being designed with "free form surfaces", that is, surfaces that do not inhibit any symmetry any more or are not restricted by any symmetry requirements. A full surface profile is determined, for example by providing sagitta for each surface over the whole area, and forwarded to a manufacturing site, for example for grinding, polishing, coating and/or edging.

Prescription sunglasses for large wrapped frames suffer from cosmetic limitations for stronger prescriptions, and the delivery ranges are limited due to the thickness limitations of the puck, that is, the uncut finished spectacle lens. This is particularly a problem for the myopic prescriptions, where the temporal edge thickness can get quite high for fairly moderate minus prescriptions, for example, sphere powers smaller than −2.00 diopters may give maximum edge thickness of larger than 5 mm in large frames. It is also a problem for the higher plus prescriptions where the need to have a certain minimum edge thickness may lead to high values of center thickness. Furthermore, in some of the semi-rimless styles of wrapped frames (for example, the so-called "blade frames") any differences in the thickness profiles in the two lenses making a pair become quite obvious and are considered undesirable by wearers wishing to see their eyewear more symmetrical. A known solution to this problem has been to use spherical or toric shaped carrier surfaces that had a step change in slope and curvature across the boundary between the central prescription zone and peripheral temporal zone. This approach required a two-pass surfacing process and was not compatible with the free-form soft pad polishing tools being used by the lens surfacing industry currently.

Early attempts to introduce a blended carrier based on the disclosures of document WO 97/35224 were not well tolerated by wearers and were abandoned. There was no provision for edge thickness difference reduction between a pair of lenses for the two eyes, and this method was not flexible enough to lend itself to such application. Unlike WO 97/35224, the carrier surface needs to be applied to both single vision and progressive lens surfaces.

Further reference is made to US patent application US 2015/0338680 A1 of the same applicant and published on Nov. 26, 2015, showing a computer-implemented method for providing a modified lens shape for an uncut lens blank.

Further documents related to lens design are WO 03/050596 A1, WO 2004/029694 A1; US 2007/008488 A; US 2005/206840 A; US 2005/225719 A; US 2006/274258 A; US 2008/024719 A; US 2008/284978 A; WO 2008/135178 A1; US 2012/008089 A; US 2010/296048 A; US 2011/134388 A; U.S. Pat. No. 7,070,274 B2; U.S. Pat. No. 7,445,333 B2; U.S. Pat. No. 7,527,376 B2; U.S. Pat. No. 8,002,404 B2; U.S. Pat. No. 8,118,425 B2; U.S. Pat. Nos. 8,449,111; 4,561,736 A and US 2013/107205 A.

Based on this, it is an object of the current invention to overcome the above issues.

SUMMARY OF THE INVENTION

According to a first aspect of the invention, there is provided a computer implemented method for providing a lens shape for an ophthalmic lens, comprising the following steps:

a) providing a predetermined lens shape of an ophthalmic lens, in particular an uncut finished spectacle lens, having a front surface and a back surface, wherein the predetermined lens shape comprises a predetermined shape of the front surface and a predetermined shape of the back surface within a prescription zone of the back surface bordered by a first boundary line, such that the ophthalmic lens satisfies predetermined optical properties within the prescription zone;

b) determining a carrier point on the back surface within the prescription zone and a plurality of carrier lines each extending from the carrier point into a respective direction, in particular straight into a respective radial direction;

c) determining a transition zone of the back surface, wherein the transition zone extends radially outwards from the first boundary line towards the outer edge of the ophthalmic lens and ends at a second boundary line bordering the transition zone radially outwards;

d) for each carrier line, setting a desired constant curvature gradient in the transition zone, in particular wherein the desired constant curvature gradient is different from zero;

e) for each carrier line, determining a curvature profile of the back surface between the first boundary line and an outer edge of the ophthalmic lens along the carrier line, and wherein the curvature profile in the transition zone is determined based on the respective desired constant curvature gradient.

In particular, the predetermined lens shape may comprise a predetermined shape of the whole front surface. In particular, there plurality of carrier lines may comprise 4 carrier lines, more preferably 8 carrier lines and even more preferably 18 carrier lines. In particular, the constant curvature gradient in the transition zone is in the direction of the respective carrier line. Further, in particular, curvature profile of the back surface between the first boundary line and an outer edge of the ophthalmic lens along the carrier line is in the direction of the carrier line. In particular, a curvature along the carrier line between the second boundary line and the outer edge is essentially constant, in particular constant, and equals the curvature along the carrier line in the transition zone at the second boundary line.

The desired constant curvature gradient may be the same for each carrier line. However, step d) does not need to be conducted for all carrier lines before step e) is started for one of the carrier lines. The steps d) and e) may be completed for one carrier line and subsequently conducted for a further carrier line. The desired constant curvature gradient may be different for different carrier lines. The desired constant curvature gradient may be individually or independently set for each carrier line. However, steps d) and e) may also be conducted simultaneously for different carrier lines. In general, steps d) and e) may also be defined as a single step. The single step may comprise, for each carrier line, setting a desired constant curvature gradient in the transition zone, in particular wherein the desired constant curvature gradient is different from zero, and determining a curvature profile of the back surface between the first boundary line and an outer edge of the ophthalmic lens along the carrier line, and wherein the curvature profile in the transition zone is determined based on the respective desired constant curvature gradient.

Further, according to a second aspect of the invention, there is provided a method for providing a smoothed extension surface from a plurality of carrier lines extending radially outwards of a prescription zone, the method comprising the following steps:

I) providing a plurality of carrier lines each extending from a carrier point in the prescription zone into a respective direction, wherein a curvature profile of the surface along each carrier line radially outwards of the prescription zone is provided by a cubic spline, in particular by a respective cubic spline;

II) forming a set of truncated Fourier series of a definite order, in particular at least of second, third or fourth order, each approximating corresponding spline coefficients for all carrier line directions.

Further, according to a third aspect of the invention, there is provided a method for providing a surface determined by carrier lines radially outwards of a prescription zone bordered by a first boundary line, the method comprising the following steps:

i) providing a plurality of carrier lines each extending from a carrier point in the prescription zone into a respective direction, wherein a curvature profile of the surface in a direction along each carrier line radially outwards of the prescription zone has at least one section, wherein the curvature profiles of corresponding sections of each carrier lines are provided by respective or corresponding polynomials, in particular wherein coefficients of the polynomials are different for each carrier line, ii) forming a series of coefficient values of corresponding coefficients of the polynomials of each carrier line, in particular wherein the series of coefficient values of corresponding coefficients of the polynomials is formed of corresponding coefficients in the angular direction, iii) determining, for each corresponding coefficient, a first Fourier series of a first order approximating the series of coefficient values, to obtain a first set of Fourier series each dependent on an angle around the carrier point.

In particular, the first set of Fourier series may be obtained so that it describes any carrier line or carrier line profile in a radial direction for a given angle. The angle around the carrier point may also be defined as the angle in the tangential direction. The carrier lines extend into the radial direction. In particular, in any aspect of the invention and in any refinement, the Fourier series may be at least of second, third or fourth order. In particular, the first order of the first Fourier series and/or the second order of the second Fourier series may be at least order 2 or order 3 or order 4.

Further, according to a fourth aspect of the invention, there is provided a method for manufacturing an ophthalmic lens, comprising the steps of providing a lens shape for an ophthalmic lens according to the first aspect of the invention or one of its refinements or according to the third aspect of the invention or one of its refinements, and manufacturing the ophthalmic lens according to the lens shape.

Further, according to a fifth aspect of the invention, there is provided an ophthalmic lens, comprising a front surface and a back surface, wherein the front surface is a convex rotationally symmetric surface, and wherein the back surface comprises a prescription zone which is asymmetric, a margin portion and a transition zone located between the prescription zone and the margin portion, and wherein a curvature gradient of the back surface along a straight line emanating from a point on the back surface is constant within the transition zone. In particular, the transition zone may have the same length along any straight line emanating from the point. In particular, the length is measured parallel to a plane tangential to the point of the back surface or the carrier point. Instead of the prescription zone being "asymmetric", the prescription zone may also be defined as having no point symmetry or line symmetry. In particular, a curvature in the direction of the straight line along the straight line the margin portion is essentially constant, in particular constant. Further the essentially constant curvature, in particular constant curvature, may equal the curvature in the direction of the straight line along the carrier line in the transition zone at the margin portion or at boundary to the margin portion.

In particular, according to all aspects of the invention and in every refinement, the ophthalmic lens may be a finished lens or finished spectacle lens, in particular for manufacturing a spectacle lens. A "finished lens" or "finished spectacle lens" is a lens of which both sides have their final optical surface and which may be either edged or uncut. In particular, the ophthalmic lens may be an uncut finished spectacle lens for manufacturing a spectacle lens.

Further, according to a sixth aspect of the invention, there is provided a method for minimizing the difference in thickness between two ophthalmic lenses for the same spectacles, comprising the following steps:

A) providing, for each ophthalmic lens, an original lens shape satisfying predetermined optical properties over the complete back surface and a modified lens shape having a front surface and a back surface, wherein the modified lens shape comprises a predetermined shape of the front surface and a predetermined shape of the back surface within a prescription zone of the back surface bordered by a first boundary line, such that the ophthalmic lens satisfies the predetermined optical properties within the prescription zone, and an extension of the back surface radially outwards of the prescription zone by carrier lines;

B) adapting the modified lens shape of the ophthalmic lens having a smaller maximum thickness by replacing the back surface by a combination of the original lens shape and the modified lens shape according to $$CS = OS + A \cdot (MS - OS)$$

wherein CS is the sagittal height of the combined back surface, OS is the sagittal height of the back surface of the original lens shape, MS is the sagittal height of the back surface of the modified lens shape and A is a value from and including 0 to and including 1, and C) optimizing A so that the difference in thickness between the two ophthalmic lenses is minimized.

In particular, the sagittal height of CS, the sagittal height of OS and the sagittal height of MS are each determined within the same reference system. In particular, the thickness may be a maximum edge thickness, in particular along a frame line. In particular, the two ophthalmic lenses may be minus lenses or minus power lenses.

According to a seventh aspect, there is provided a, in particular non-transitory, computer program product comprising program code for carrying out the steps of a method according to the first aspect of the invention or one of its refinements or the third aspect of the invention or one of its refinements or the sixth aspect of the invention or one of its refinements, in particular when the computer program product is run on a data processing device.

According to an eighth aspect, there is provided a, in particular non-transitory, machine readable storage medium having stored thereon a computer program comprising program code for carrying out the steps of a method according to the first aspect of the invention or one of its refinements or the third aspect of the invention or one of its refinements or the sixth aspect of the invention or one of its refinements, in particular when the computer program or the program code is run on a data processing device.

Further, according to a ninth aspect of the invention, there is provided a method for constructing a surface determined by carrier lines radially outwards of a prescription zone bordered by a first boundary line which closely matches the prescription zone at the first boundary and has a high degree of angular smoothing at a second boundary line, the method comprising the following steps:

aa) providing a plurality of carrier lines each extending from a design reference point or carrier point in the prescription zone into a respective direction, wherein a curvature profile of the surface along each carrier line radially outwards of the prescription zone, in particular between the first boundary line and the second boundary line, is provided by a cubic spline;

bb) forming a first set of truncated Fourier series of a definite high order each approximating corresponding coefficients of a first spline for all carrier line directions, cc) forming a second set of truncated Fourier series of a definite low order each approximating corresponding coefficients of a second spline for all carrier line directions, dd) determine a third spline sufficient to determine a surface height at any radial location within the range of the carrier lines for any specified carrier line direction by a weighted average of the first spline and second spline for that direction, where the weighting function is a specified polynomial function of the radial distance from the first boundary.

In other words, this invention proposes introducing a blended cosmetic carrier in the peripheral areas of the lens which are seldom used for foveal vision while retaining the optimized optical design in the central region or prescription zone of the lens. The carrier surface may blend smoothly into the prescription zone and may be selected to have an approximately constant maximum radial power gradient of moderate magnitude that was found to be acceptable by most wearers. The selected radial power gradient of the carrier surface may be different in the pair of lenses for the two eyes to minimize the maximum temporal edge thickness difference between the lenses of the pair. To this end, a portion of an optically optimized free-form lens surface is replaced by a cosmetic extension having a constant or nearly constant rate of change (ROC) of tangential curvature in the radial directions, for example over the ring bounded by radii $R_{in}$, which is the first boundary line, and $R_{out}$, which is the second boundary line, centered on coordinates $(x_o, y_o)$ and an approximately constant tangential curvature outside the radius $R_{out}$. The coordinates $(x_o, y_o)$ designate a carrier point, in particular on the back surface. The extension is smoothly blended with the central portion or prescription zone at the radius $R_{in}$ circle to ensure continuity of surface heights, slopes and curvatures at the $R_{in}$ boundary. The center of the ring defining the carrier or carrier point is preferably decentered in the nasal direction relative to the prism reference point (PRP) to limit the presence of the carrier extension to the temporal side of the edged and fitted lens. The extent of the ring and the ROC of curvature in the carrier zone or transition zone may depend on the amount of lens thickness reduction required to achieve a cosmetically acceptable maximum edge thickness of the lens in the frame for the minus lenses or the center thickness for the plus lenses or plus power lenses, which will usually be dictated by the prescription or predetermined optical properties. For example, the width of the transition zone may range from 10 mm to 20 mm, and the gradient of curvature may vary from 0.05 to 1.0 diopters per mm (D/mm), preferably from 0.05 to 0.5 D/mm, more preferably from 0.05 to 0.25 D/mm. Usually, the sign of the radial gradients will be negative for the minus powered lenses and positive for the plus powered lenses aiming to reduce their center thickness.

In particular, the carrier extension may be calculated in the following way:

For a predetermined number, for example 8, 16, 32, 64, 128, 180, 256, 360 or 512, of equally spaced radial directions initial radial extensions or carrier lines are computed, each aiming to provide the required curvature profile.

In each of these directions the predetermined width from an inner radius ($R_{in}$) to an outer radius ($R_{out}$) may be divided into equal steps, in particular each step is not larger than 1 mm, preferably not larger than 0.5 mm. In general, the steps may also be chosen not to be of equal length.

The height, Z, and slope dZ/dR is determined, and may be temporarily stored, for the endpoints of each step as follows:

The height and $1^{st}$ and $2^{nd}$ derivatives of the prescription zone are computed at R along the respective carrier line.

A cubic polynomial P(R) is determined, for example by an iterative calculation, such that the P, dP/dR and $d^2P/dR^2$, P and its first and second derivates in the radial direction, all match the prescription zone at $R_{in}$ and such that the curvature at the end of the first step is changed by the required amount. The required amount is the change of curvature that would have occurred at the end of the respective step with a constant curvature gradient. This provides the values of Z and dZ/dR at the end of the step as well as P, dP/dR and $d^2P/dR^2$ for the start of the next step.

This process is repeated for each step.

It may happen that the required curvature change is achieved within a single step with the variation in curvature along the step becoming very non-linear. This condition may be detected by checking the curvature of P(R) at the midpoint of the step. If the condition is detected, then from that point on, until $R_{out}$ is reached, P(R) from the previous step may be continued unchanged for that particular direction.

When this process reaches $R_{out}$ the coefficients of the quartic expansion of a circular continuation are computed, and may be temporarily stored.

Optionally, the basic procedure for evaluating the extension may be by cubic interpolation within a step between $R_{in}$ and $R_{out}$ using the values of Z and dZ/dR at each end of the step, or by evaluation of the quartic polynomial beyond $R_{out}$.

Optionally, to provide angular smoothing the coefficients determined for each of the radial directions may not be used directly. Instead, for each coefficient a Fourier series may be constructed. The corresponding coefficient for a general direction is then determined by evaluating its Fourier series. In this, a pair of Fourier series may be constructed for each coefficient, one of high order, for example order 16, and another of low order, for example of order 4. The high order is required to achieve a good match between the inner surface at $R_{in}$ and the start of the extension. The low order is needed to provide the degree of angular smoothing typically needed for a complex progressive surface. The final extension surface may then be defined by a blend of the high-order and low order forms of the extension:

$$Z=Z_2(A,R)+W(R)\cdot(Z_1(A,R)-Z_2(A,R)) \text{ for } R_{in}<=R<R_{in}+\text{delta};$$

wherein $Z_1$ is the Fourier series of low order at angle A and radial distance R from the carrier point, wherein $Z_2$ is the Fourier series of high order at angle A and radial distance R from the carrier point, and $$Z=Z_1 \text{ for } R_{out}>=R>=R_{in}+\text{delta};$$

where W(R) is the quintic polynomial $W(R)=10\cdot t^3-15\cdot t^4+6\cdot t^5$, wherein $$t = \frac{(R-RD)}{\text{delta}},$$

with RD being $R_{in}$ and delta being the width of the blending zone.

This provides a smooth transition from the high order form of the extension at $R_{in}$ or the first boundary line to the low order form at $R_{in}$ plus delta. The width of this blending zone, delta, may be 0.6 times $R_{in}$. This was found to work well in practice. An additional refinement may be to have the extension constructed in a coordinate system that is aligned to the tangent plane to the initial surface at $(x_o, y_o)$.

Therefore, in the method for providing a lens shape for an ophthalmic lens according to the first aspect, the transition zone is predetermined between the first boundary line or inner radius and the second boundary line or outer radius. In an embodiment, the transition zone may be predetermined with a constant width. Within that transition zone, a constant curvature gradient is developed by the method. This provides for the advantages efficacy in achieving the objectives, visual comfort and simplicity in implementation. Further, the carrier extensions can be found in a forward only manner via the predetermined length and constant curvature gradient in the transition zone. In particular via a stepwise development starting at the first boundary line towards the second boundary line, a function describing each carrier extension can be found in a reliable manner. This may also provide for a stable method leading to a workable solution but also may avoid the need for further optimization routines once the optical properties for the prescription zone have been predetermined.

By the method for angular smoothing of the surface determined by carrier lines radially outwards of a prescription zone according to the third aspect, the general description of the carrier lines in angle and radial distance from a carrier point can be found. Hence, a generally applicable function will be found that provides for a carrier line extension in any given angular direction. This is done by describing the carrier lines in a certain direction via corresponding polynomials. Preferably, these polynomials are of the same order and of the same type of polynomial. By this, corresponding coefficients exist in every polynomial. Corresponding coefficients can now be put in a series in the angular direction and that series can be described by the Fourier series. By using a proper order of the Fourier series, flattening or smoothing of the polynomials can be found. Hence, for each coefficient of the polynomials describing the carrier extension in the transition zone, the Fourier series can be found dependent on the angle. This can be done for the transition zone being described by a single polynomial, for example cubic polynomial only, meaning that the transition zone only has one section. However, in case of the stepwise approach according to refinements of the first aspect of the invention, the transition zone can also comprise more than one section each described by a corresponding polynomial and corresponding coefficients for each carrier line in each direction. Hence, this can also be applied for more than one section in case corresponding sections are described by corresponding polynomials in each angular direction. Further, the polynomials or the profile function outside of the prescription zone should be two times continuously differentiable in the radial direction.

Consequently, this leads to a method of manufacturing according to the fourth aspect of the invention and an uncut finished spectacle lens according to the fifth aspect of the invention that embody corresponding advantages.

A method for minimizing the difference in thickness between two ophthalmic lenses for same spectacles according to the sixth embodiment provides for a stable and simple optimization to adapt a lens shape of a lens so as to minimize a measure of the thickness difference between two ophthalmic lenses for the same spectacles. In particular, this is not achieved by replacing the back surface outside of the prescription zone by carrier extensions but, starting from the full description of the back surface satisfying predetermined optical properties, only a fraction of a difference between modified lens shapes, that for example could have been achieved via the methods according to the first aspect of the invention or one of its refinements or the second aspect of the invention or the third aspect of the invention or one of its refinements, is applied. This may be useful to provide both ophthalmic lenses with corresponding aesthetical appearances.

Thus, the computer program product according to the seventh aspect of the machine readable storage medium according to the eighth aspect embody the same advantages as the methods according to the first, second and fifth aspects of the invention.

The term "uncut finished spectacle lens" according to the current application is intended to mean a lens blank having two surfaces, that is, the front surface and the back surface, which both have their final shape prior to edging. This corresponds to section 8.4.7 of the standard DIN EN ISO 13666: 1998-11 of the DIN Deutschen Institut für Normung e.V. Also, the term "uncut lens" according to 8.4.7 of the standard DIN EN ISO 13666: 1998-11 of the DIN Deutschen Institut für Normung e.V. may be used. A coating may be applied to none, one or both of the surfaces. It may have a circular or elliptical shape. In case of a circular lens blank, the diameter may be at least 60 mm, in particular from 60 mm to and including 90 mm. In case of an elliptical lens blank, the smallest diameter may be at least 60 mm, in particular from 60 mm to and including 90 mm.

A "meridian" is intended according to 5.7.1 of DIN EN ISO 13666 to mean any plane which contains the center of curvature of such a surface.

In the context of the present application, a "visual point" is in this case intended to mean the point on the back surface of the spectacle lens at which the line of sight intersects the back surface of the spectacle lens, when the eye assumes a relaxed position. This is also referred to as "primary position" according to No 5.31 of the standard DIN EN ISO 13666, that is, a position of the eye relative to the body for the case in which the eyes look straight in a fixation direction at an object which lies at eye level. The position of the fitting point may be placed and readable as a marking in the uncut finished spectacle lens.

In the case of decentration according to No 5.23 in the standard DIN EN ISO 13666 of the spectacle lens, the required centration point is different from the boxed center in the form of the edged spectacle lens, compare No 5.23 for "decentration" with No 5.24 "centration point" in the standard DIN EN ISO 13666. In particular, the cross-sectional plane may then comprise the "fitting point" according to No 5.24 of the standard DIN EN ISO 13666, that is, the point on the front surface of the spectacle lens or of the uncut finished spectacle lens which, according to the stipulation of the manufacturer, is to be used as a reference point for positioning the lens in front of the eye. The position of the fitting point is generally placed and readable as a marking in the uncut finished spectacle lens.

The terms "front surface" and "back surface" in the context of the present application correspond to those of the standard DIN EN ISO 13666: 1998-11 of the DIN Deutschen Institut für Normung e.V. According to No 5.8 of the standard DIN EN ISO 13666, the term "front surface" is intended to mean the surface of the spectacle lens which is intended to face away from the eye in the spectacles. According to No 5.9 of the standard DIN EN ISO 13666, the term "back surface" is intended to mean the surface of a spectacle lens which is intended to face towards the eye in the spectacles. However, the term "front surface" and "back surface" could also be exchanged by "first surface" and "second surface", respectively.

A "prescription" is commonly known as the optical values to be fulfilled by an optical design to correct for the aberrations of the human eye of the wearer. In particular, the prescription can provide sphere cylinder and axis values or equivalent parameters. Further, an addition, that is, a difference between the near and the far portion of the lens can be prescribed as well as certain prismatic powers along an associated axis.

The "carrier point" on the back surface is the point from which the carrier lines, in particular straight carrier lines, emanate. It can be any point on the back surface of the lens. However, preferably it is the point within the surface area within first the boundary line, that is, the prescription zone. In examples, the carrier point can be the visual point and/or the geometrical center of the uncut finished spectacle lens. In particular, the carrier point may be decentered 10 mm nasally from the prism reference point. In particular, the decentration may be determined within a design reference plane or determined projected into a plane parallel or identical to the tangential plane of the geometric center of the back surface of the respective lens. The prism reference point may be the point on the front surface stipulated by the manufacturer at which the prismatic effect of the finished lens is determined.

The "first boundary line" determines the outer boundary of the back surface area to be preserved or of the prescription zone. The boundary line is not a straight line. The boundary line may be a section of a circle but does not necessarily need to be a section of a circle. It is a curve that encloses the prescription zone, that is, the back surface area to be preserved. It may be a closed line. However, it can also start and end on the outer edge of the uncut finished spectacle lens, that is, such that the enclosed surface area is "open" radially outwards. In particular, it may cover only one side of the lens area, for example the temporal side. The line may be a circle or have a different shape, for example a shape corresponding to a frame into which the ophthalmic lens is to be inserted.

Hence, the "prescription zone" is to be understood as the surface area of the back surface which is preserved and satisfies desired optical properties, for example, the prescription. The carrier lines then extend radially outwards from that prescription zone. As an alternative to "prescription zone", the term "optical zone" can be used.

A "curvature profile" means the profile or development of the curvature of the surface in a particular direction. In particular, it may be the curvature profile of the back surface along a carrier line, that is, in the direction of a carrier line.

A "carrier line" as previously explained may be a carrier line running at a certain angle and emanating from the carrier point. In particular, it can be a straight carrier line projected into a suitably oriented plane, for example a plane tangential to the geometric center of the back surface of the lens. The geometric center may be defined as the intersection of the horizontal and vertical centerlines of the shape of the lens, in particular of the ophthalmic lens or the uncut finished lens blank. For example, in case the carrier point is the geometrical center of the uncut finished spectacle lens, the angle would develop around the geometrical center line of the lens. In case the carrier point is not the geometrical center, a corresponding line parallel to the geometrical center line could be defined through the carrier point.

A "thickness requirement" for the ophthalmic lens is a condition or boundary condition. For example, the thickness requirement may be a value set for the smallest thickness of the outer edge of uncut finished spectacle lens along its periphery. This applies to plus lenses or plus power lenses, in particular. As a further example, the thickness requirement may be a minimum thickness of the outer edge of uncut finished spectacle lens along its periphery. Hence, a value for the smallest thickness of the outer edge of uncut finished spectacle lens along its periphery has to be equal or larger than the minimum thickness. Further, it may be a maximum thickness along a frame line, that is, the outer edge of the edged lens. This applies to minus lenses, in particular.

In a refinement of the method according to the first aspect of the invention, a curvature along the carrier line between the second boundary line and the outer edge is essentially constant, in particular constant. The curvature between the second boundary line and the outer edge may equal the curvature along the carrier line in the transition zone at the second boundary line.

The curvature along the carrier line is the curvature in the direction of the respective carrier line. A constant curvature may be achieved for example, by continuing the carrier line as a circular arc or circular arc section beyond the second boundary line towards the outer edge. In case the curvature shall be zero, continuing the carrier line as a straight line would also be possible in theory. An essentially constant curvature between the second boundary line and the outer edge may also be constructed via a quartic expansion or quartic polynomial of a circular extension.

In a refinement of the method according to the first aspect of the invention, the desired constant curvature gradient is set based on the curvature of the prescription zone at the first boundary line and a boundary condition for the curvature within the transition zone. In particular, the curvature gradient may be set based on a desired thickness reduction or desired thickness requirement of the ophthalmic lens along the carrier line.

By this, a constant curvature gradient can be found that fits the desired needs. In general, the constant curvature gradient may be the same for each carrier line. Alternatively, the constant curvature gradient may be different for different carrier lines. The constant curvature gradient may be set individually for each carrier line. In other words, the constant curvature gradient may vary with angle. A boundary condition for the curvature within the transition zone may be zero and/or curvature of the front surface in the same reference system. Of course, other curvatures may be set. Further, the curvature gradient may be set so as to achieve a desired thickness reduction or a desired thickness at a specific point along the carrier line, for example the second boundary line or at an outer edge of the ophthalmic lens. In particular, in case of minus lenses, the boundary condition may be that the curvature and/or slope of the back surface shall not become smaller than the curvature and/or slope of the front surface within the same reference system. This means that by that boundary condition, the lens might not become too thin radially outwards Further, by setting a boundary condition to zero, it would be avoided that the sign of the curvature would change.

According to a further refinement of the method according to the first aspect, the desired constant curvature gradient may be set based on the curvature of the prescription zone at the first boundary line and the curvature target to be reached at the second boundary line, and wherein the curvature target is zero and/or a curvature of the front surface. In particular, the curvature of the front surface is determined in the same coordinate system or reference system as the curvature of the back surface. Further in particular, the front surface is a spherical surface.

By this, provided the curvature of the prescription zone at the first boundary line and the curvature target being zero or the curvature of the front surface within the same reference system at the second boundary line, the start and end points for the curvature along the carrier line through the transition zone are set. Given the width or length, in particular constant length, of the transition zone, the constant curvature gradient or desired constant curvature gradient can be determined in a straight forward manner.

In a further refinement of the method according to the first aspect, the curvature gradient is set to be negative in case the ophthalmic lens is a minus lens or minus power lens and the curvature gradient is set to be positive in case the ophthalmic lens is a plus lens or plus power lens.

Of course, this may be dependent on the reference system chosen. In case a plane tangential to the vertex point of the front surface, in particular a spherical front surface, or a plane tangential to the back surface at the geometric center of the back surface of the lens is chosen as a zero plane, curvature of the front surface could be chosen to be positive. Then, the curvature gradient being set negative in case of a minus lens would lead to the curvature of the back surface decreasing and the back surface bending "back" towards the zero plane, for example until a curvature of zero is met, that is, the back surface is not bent anymore but runs straight from a certain point radially outwards.

In a further refinement of the method according to the first aspect of the invention, the curvature profile is determined by determining a cubic spline from the first boundary line to the second boundary line, wherein the cubic spline is comprised of a plurality of sections each described by a cubic polynomial, and wherein the cubical polynomials are determined section-wise from the inner boundary line to the outer boundary line. This may be done such that a sagittal height, a slope and a curvature of the back surface along the carrier line are continuous and the curvature along the carrier line changes over each section resulting in an approximate and constant curvature gradient over the transition zone. In particular, by setting a constant length for the sections, the curvature along the carrier line may change over each section by the same amount.

This way, the desired constant curvature gradient can be achieved over the transition zone by using a cubic spline comprised of a plurality of sections each described by a cubic polynomial. The stepwise development takes place from the first boundary line to the second boundary line. The cubic spline is a polynomial of third order meaning that four parameters are available for constructing a respective polynomial. The sagittal height, the first derivate or slope and the second derivate or curvature in the radial direction at the start of the carrier line and the first boundary line already determine three of these parameters. Hence, a fourth parameter remains for designing the curvature gradient over the transition zone. By knowing the target curvature at the second or outer boundary line, it is possible to predict in advance the curvature at the end of each step that should be reached to find an approximate constant curvature gradient over the complete transition zone. Hence, the target curvature for the end of each step is known as well and is used to set the fourth parameter of the cubic polynomial for each step. This again leads to the starting conditions for the next step and so on. By this, using cubic splines and the stepwise development, an approximate constant curvature gradient can be developed starting from the first boundary line towards the second boundary line.

In a further refinement of the method according to the first aspect of the invention, the curvature profile is determined by determining a cubic spline from the first boundary line to the second boundary line, wherein the cubic spline is comprised of a plurality of sections each described by a cubic polynomial, and wherein the cubic polynomials are determined section-wise from the inner boundary line to the outer boundary line such that a sagittal height, a slope and a curvature of the back surface along the carrier line are continuous and the curvature gradient is reset to the desired constant curvature gradient for each polynomial at the radially inwards end of each section.

This way, it is not the curvature target at the end of each step that is used to define the cubic polynomial for each step. Instead, the curvature gradient may be reset to the desired constant curvature gradient at the start of each section. Particular in case relatively small steps are chosen, this can also serve to find an approximate constant curvature gradient over the transition zone via a cubic spline comprised of cubic polynomials. The smaller the steps are chosen, the better the constant curvature gradient may be approximated.

In a further refinement, a length of the transition zone along each carrier line is constant resulting in a second boundary line bordering the transition zone radially outwards and the second boundary line being radially offset from the first boundary line by the length.

In this refinement, a constant length is set for the transition zone along each zone. However, this is just one possible embodiment. The length of the transition zone may also be determined independently for each carrier line. The length of the transition zone may be different for each carrier line.

In a further refinement of the method of the first aspect of the invention, the length of the transition zone is within a range of at least 10 mm up to and including 20 mm. In particular in may be 10 mm, 15 mm or 17.5 mm.

In a further refinement of any aspect of the invention, the constant curvature gradient may have a magnitude in the range from and including 0.05 diopters/mm to and including 1.5 diopters/mm, in particular it may be 1.2 diopters/mm. In particular, the constant curvature gradient may have a magnitude different from zero. In particular, the constant curvature gradient has a magnitude in a range from and including 0.05 diopters/mm to and including 1.0 diopters/mm with a length of the transition zone being more than 12 mm. The constant curvature gradient may have a magnitude in a range from and including 1.0 diopters/mm to and including 1.5 diopters/mm with a length of the transition zone being less than or equal to 12 mm. For an even shorter length of the transition zone, the constant curvature gradient may be larger than 1.5 diopters/mm, for example 4 diopters/mm or even 5 diopters/mm.

These parameters have been found to provide for aesthetically pleasant ophthalmic lenses with good peripheral vision and dynamic vision performance in common prescription ranges.

In a further refinement of the method according to the first aspect of the invention, the length of each section is within the range of at least and including 0.5 mm up to and including 2 mm. In particular, the length of each section may be 1 mm.

This has been found to be a sufficiently short interval to provide for the approximately constant curvature gradient. Generally, the length of each section may be constant, that is, each section along a respective carrier line may have the same length. Further, the length may be constant for all carrier lines. However, alternatively, the length may be set independently or differently for each carrier line. This way, for example, the number of sections may be kept constant between different carrier lines even in case the length of the transition zone varies.

In the further refinement of the method according to the first aspect of the invention, the method further comprises a step of checking, for each carrier line, whether a thickness of the spectacle lens at an outer edge and/or at an intended frame line along with the ophthalmic lenses to be edged is above a predefined threshold or satisfies a predetermined thickness requirement and, if not, changing, in particular reducing or increasing, the magnitude of the desired constant curvature gradient. Hence, in case for whatever reasons, the thickness of the lens according to the acquired lens design should be too small, the magnitude of the desired constant curvature gradient could be reduced in case of a minus lens or minus power lens and could be increased in case of a plus lens or plus power lens. Then, the method could be conducted again to provide for a proper lens design. By such a check for each carrier line, non-workable solutions or results providing for too small thicknesses can be avoided.

According to a further refinement of the method according to the first aspect of the invention, the ophthalmic lens is an uncut finished spectacle lens.

Such uncut finished spectacle lens is larger than the finally edged ophthalmic lens for the spectacles and the uncut finished spectacle lens may be of circular or elliptical shape. The intended frame line along which an ophthalmic lens shall be edged may be known in advance and, therefore, the carrier point may be placed correspondingly.

According to a further refinement of the method according to the first aspect of the invention, the curvature profile of the predetermined lens shape of the back surface is preserved within the first boundary line.

By this, the predetermined optical properties are maintained within the prescription zone.

According to a further refinement of the method according to the first aspect of the invention, at least the sagittal height of the prescription zone of the back surface transitions continuously at the first boundary line into each carrier line. Preferably, further a slope of the prescription zone of the back surface in the direction along the carrier line's transitions continuously at the first boundary line into each carrier line. Even more preferably, further a curvature of the prescription zone of the back surface in the direction along the carrier line transitions continuously at the first boundary line into each carrier line.

The back surface may be continuous at the first boundary line for each carrier line. Preferably, for each carrier line, the back surface is continuously differentiable in the radial direction, in the direction of the carrier line, at the first boundary line. Even more preferably, for each carrier line the back surface is twice or two times continuously differentiable in the radial direction, that is, in the direction of the carrier line, at the first boundary line. The sagittal height and the first derivate of the back surface in the radial direction along the carrier line may be continuous at the first boundary line. The second derivate of the back surface in the radial direction along the carrier line may be continuous as well. No jumps or kinks may be provided within the back surface. The curvature may be continuous. However, a jump, in particular a slight jump, in curvature may be allowed at the first boundary line.

According to a further refinement of the method according to the first aspect of the invention, the length is to be measured within a plane parallel to a tangential plane in the carrier point of the back surface. It may also be measured within a plane parallel to or identical to a plane tangential to the geometric center of the back surface of the lens or a plane tangential to the back surface at the geometric center of the back surface of the lens.

By this, a length or width, in particular a constant length or constant width, of the transition zone of the back surface between the first and the second boundary lines in the radial direction can be set.

According to a further refinement of the method according to the first aspect of the invention, the carrier point is offset nasally from a prism reference point of the ophthalmic lens.

That way, the nasal portion of the lenses inside the frame comprise the prescription zone with good optical properties. Outwards towards the temple side of the ophthalmic lenses, the prescription zone is smoothly blended into the margin zone.

According to a further refinement of the method according to the first aspect of the invention, the first boundary line is circular and the second boundary line circular.

Such circular boundary lines have been found to simplify the determination steps. In this refinement, the first boundary line and the second boundary have the same center point which is the carrier point. In particular, the circles can have a radius large enough so that the boundary lines extent on the temple side of the carrier point over the ophthalmic lens and are not present on the nasal side of the design reference. However, other contours of the boundary lines can be chosen, for example corresponding to an intended frame line.

In a further refinement of the method according to the first aspect of the invention, the curvature profile along each carrier line radially outwards of the second boundary line is determined via or as a circular arc or circular arc section.

This way, the carrier line may be continued with a constant curvature. A single quartic polynomial may also be determined to provide for an essentially constant curvature and an essentially circular extension of the carrier line. In particular, the curvature, slope and sagittal height in the transition zone at the second boundary line may be extended continuously outwards through the margin zone. The quartic polynomial is determined correspondingly. In case the curvature beyond the second boundary line needs not to be constant, a quadratic polynomial may be used. By requiring the same sagittal height and continuous first and second derivates of the carrier line at the second boundary line, a quadratic polynomial would already be determined.

In a further refinement of the method according to the first aspect of the invention, a method comprises a further step of angular smoothing of the back surface radially outwards of the first boundary line.

By this, a complete description of the back surface radially outwards of the first boundary line may be found. Further, differences between sagittal height of adjacent carrier lines may be flattened out to provide for a smoother curvature profile radially outwards of the first boundary line.

In a further refinement of the method according to the first aspect of the invention, a further step of angular smoothing of the back surface radially outwards of the first boundary lines is conducted by flattening a profile of the curvature of the prescription zone, which curvature is in the direction of the carrier lines, along the first boundary line via, in particular approximation by, a polynomial or a spline function or a Fourier series to obtain a flattened curvature profile, and wherein the flattened curvature profile is used as a starting curvature value for each carrier line.

By using this flattened curvature profile as radially inward starting curvature values for each carrier line, discontinuities may be present at the first boundary line in the transition from the prescription zone to the carrier lines. However, when transferring this lens design towards manufacturing, these discontinuities may be overcome when the final manufacturing parameters are determined for the processing tools. Usually, during manufacturing, bicubic splines are used to provide processing parameters for the manufacturing tools. These bicubic splines are set in a rectangular grid of x and y coordinates. At the intersection points of that grid, which is usually spaced at 1 mm intervals, the sagittal heights are submitted via the determined lens design. Further, the first derivates in the x and/or y direction may be provided along the outer circumference of the grid. The space between the intersection points of the grid are then interpolated via a bicubic spline. However, that bicubic spline may then compensate for the discontinuities that may occur due to the enforced flattening of the curvature profile along the first boundary line.

However, this quite robust approach by flattening the curvature profile along the first boundary line may already provide sufficient results as it flattens the surfaces of the transition zone and margin portion already at its "root" at the first boundary line. However, in general it has to be noted that no full surface description of the lens design in the margin portion and the transition zone is needed radially outwards of the prescription zone necessarily. As laid out above, for manufacturing, only sagittal heights at the intersection points of the manufacturing grid and the first derivate along the outer circumference are needed. In case the carrier lines are determined in a relatively narrow pattern or in a pattern that ensures that the carrier lines extend so that they would intersect with intersection points of the manufacturing grid, the sagittal height necessary for the input into the manufacturing tools would already been known.

In a further refinement of the method according to the first aspect of the invention, the method further comprises the following steps to provide for angular smoothing of the back surface radially outwards of the first boundary line:

i) forming a series of coefficient values of corresponding coefficients of a respective function describing each carrier line in the transition zone, in particular of the cubic polynomials of each carrier line, ii) determining, for each corresponding coefficient, a first Fourier series of a first order approximating the series of coefficient values, to obtain a first set of Fourier series each dependent on an angle around the carrier point, the first set of Fourier series describing any carrier line in a radial direction for a given angle.

By this, a general description of the carrier lines for any given angle is provided. Further, via the definite Fourier series of a predetermined order, that description is smoothed in the angular direction. In this refinement, the Fourier series may have any order deemed to be satisfactory. In particular, the smoothing depends on the order of the Fourier series. The higher the order of the Fourier series, the more accurate the approximation provided.

In a further refinement of the method according to the first aspect of the invention, the method comprises the further steps of:

iii) determining, for each coefficient, a second Fourier series of a second order approximating the series of coefficient values, to obtain a second set of Fourier series each dependent on an angle around the carrier point, the second set of Fourier series describing any carrier line in a radial direction for given angle, wherein the second order is higher than the first order, and wherein the second set of Fourier series is applied at the first boundary line, iv) blending the second set of Fourier series into the first set of Fourier series radially outwards over a blending zone, in particular so that only the first set of Fourier series is applied beyond the blending zone.

By this, the smoothing can be further blended from the first boundary line, that is, at the prescription zone, towards the second boundary line, that is, at the end of the transition zone and towards the margin portion. At the first boundary line, a Fourier series of high order is used that does not provide for a much smoothing and describes the series of the coefficient values of the polynomial series close to their original values previously determined. The Fourier series of low order provides for greater smoothing. Over the transition zone, the Fourier series are then blended from the high order Fourier series towards the low order Fourier series.

In a further refinement of the method according to the first aspect of the invention, the step of blending is conducted via the following formula:

$$Z=Z_2(A,R)+W(R)\cdot(Z_1(A,R)-Z_2(A,R)),$$

wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle and the radial distance based on the second set of Fourier series, and wherein W(R) is a quintic blending polynomial, in particular wherein $$W(R)=10\cdot t^3-15\cdot t^4+6\cdot t^5,$$

wherein $$t = \frac{(R-RD)}{\text{delta}},$$

and wherein RD is the radial distance between the first boundary line and the carrier point at the angle A, and wherein delta is the width of the blending zone, in particular wherein delta is 0.6 times the radial distance between the first boundary line and the carrier point at the angle A.

This way, it was found that a satisfactory blending from the definite high order Fourier series towards the definite order Fourier series can be provided. The quintic blending polynomial has been chosen since it provides for a smooth transition from the definite high order Fourier series towards the definite low order Fourier series. In particular, that polynomial provides a value for t of zero in case R is equal to RD, that is, at the first boundary line. Therefore, W(0)=0, W'(0)=0, and W"(0)=0. Further, for R=R+delta, t is 1 and W becomes 1 as well. However, W'(t=1)=0 and W"(t=1)=0 as well. This provides for a smooth transition between the Fourier series of high and low order.

In a further refinement of a method according to the third aspect of the invention, the method comprises the further steps of:

iv) determining, for each coefficient, a second Fourier series of a second order approximating the series of coefficient values, to obtain a second set of Fourier series each dependent on an angle around the carrier point, the second set of Fourier series describing any carrier line in a radial direction for given angle, wherein the second order is higher than the first order, and wherein the second set of Fourier series is applied at the first boundary line, v) blending the second set of Fourier series into the first set of Fourier series radially outwards over a blending zone, in particular so that only the first set of Fourier series is applied beyond the blending zone.

Hence, similar advantages can be achieved in the method according to the third aspect of the invention.

In a further refinement of the method according to the third aspect of the invention, the step of blending is conducted via the following formula:

$$Z=Z_2(A,R)+W(R)\cdot(Z_1(A,R)-Z_2(A,R)),$$

wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle A and the radial distance R based on the second set of Fourier series, and wherein W(R) is a quintic blending polynomial, in particular wherein $$W(R)=10\cdot t^3-15\cdot t^4+6\cdot t^5,$$

wherein $$t = \frac{(R-RD)}{\text{delta}},$$

and wherein RD is the radial distance between the first boundary line (18) and the carrier point at the angle A, and wherein delta is the width of the blending zone, in particular wherein delta is 0.6 times radial distance between the first boundary line (18) and the carrier point at the angle A.

Again, smooth blending can be provided by this from the first Fourier series towards the second Fourier series.

In particular, the above methods and teachings can be applied for minus lenses or minus power lenses, in particular in case of sports spectacles. In particular, the teachings may be applied for lenses having a curvature of the front surface of 6 to 9 diopters at a refractive index of 1.53.

As well, in a refinement of the ophthalmic lens, in particular the uncut finished spectacle lens, according to the fifth aspect of the invention, the transition zone has the same length along any straight line emanating from the point. In particular, the length is measured parallel to a plane tangential to the point of the back surface or tangential to the back surface at the point of the back surface.

In a further refinement of the ophthalmic lens, in particular the uncut finished spectacle lens, according to the fifth aspect of the invention, the length of the transition zone is within a range of at least 10 mm up to and including 20 mm, in particular 10 mm, 15 mm or 17.5 mm.

It is to be understood that the features mentioned above and those yet to be explained below may be used not only in the combination respectively indicated, but also in other combinations or separately, without departing from the scope of the present invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
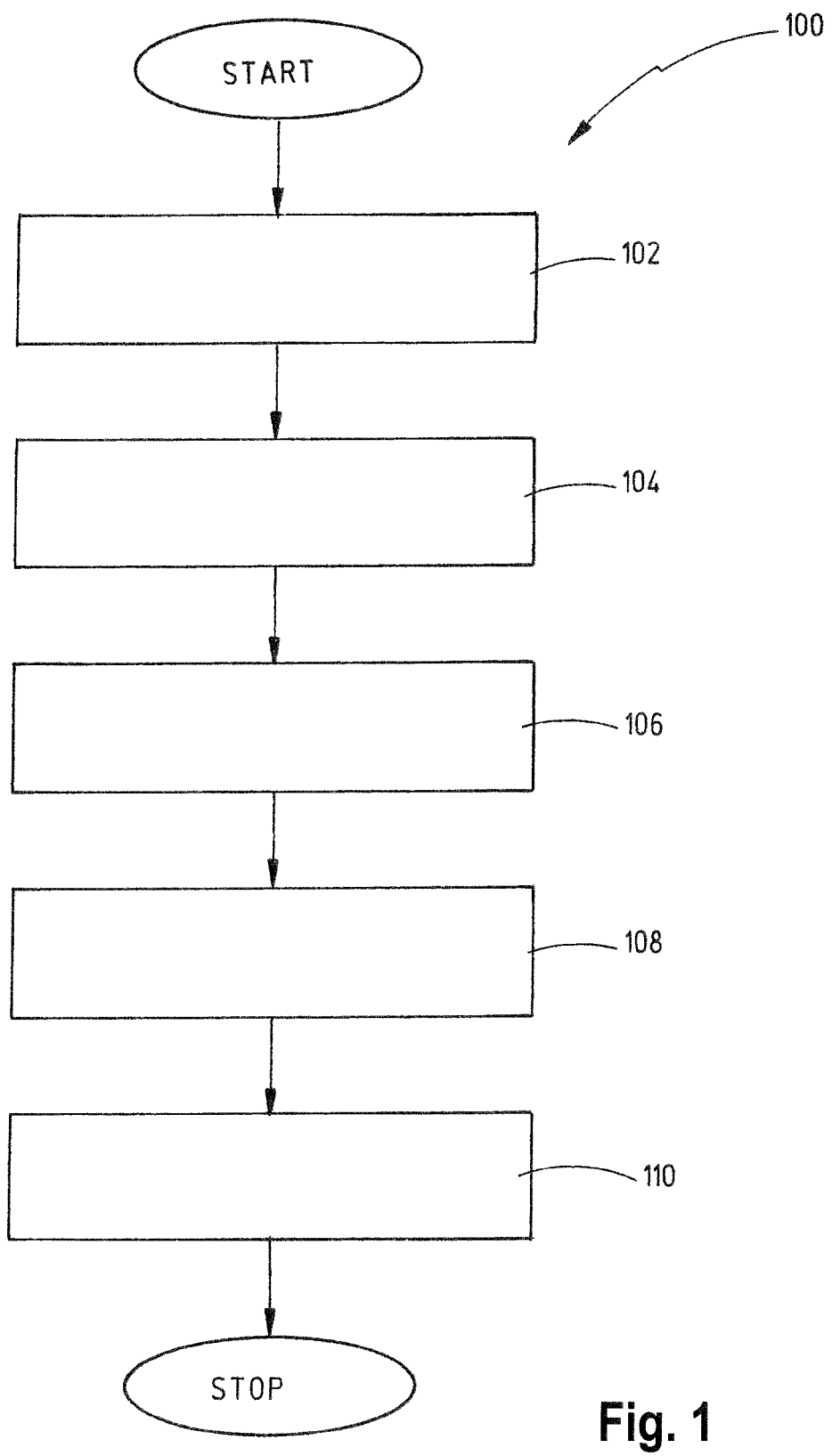
FIG. 1 shows an embodiment of a method for providing a lens shape for an ophthalmic lens.

FIG. 1 shows an embodiment of the method according to the first aspect of the invention. The method is generally designated by reference numeral 100.

The conduction of the method, in the following, is explained viewing both FIGS. 1 and 2.

At first, a step 102 is conducted of providing a predetermined lens shape 10 of an ophthalmic lens, in particular an uncut finished spectacle lens, having a front surface and a back surface, wherein the predetermined lens shape comprises a predetermined shape of the front surface and a predetermined shape of the back surface within a prescription zone of the back surface bordered by a first boundary line, such that the ophthalmic lens satisfies predetermined optical properties within the prescription zone.

Figure 2:
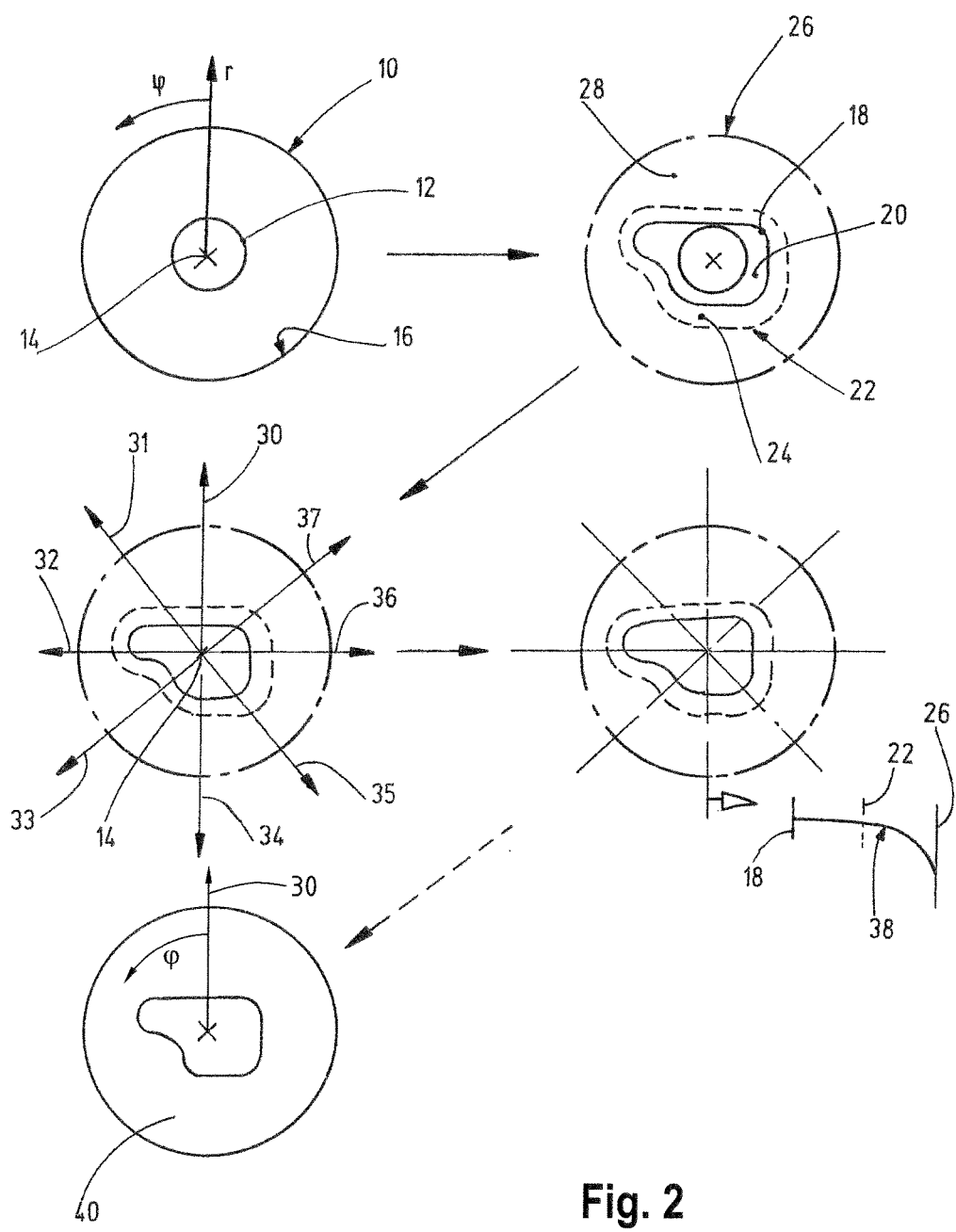
FIG. 2 shows a simplified diagram showing and illustrating an embodiment of the different steps of the method in FIG. 1.

In FIG. 2, the uncut finished spectacle lens 10 is schematically shown with a view on the back surface in the upper left. The method 100 then follows the arrows to the bottom line. The uncut finished spectacle lens has a periphery or outer edge 16 of the ophthalmic lens, which may be an uncut finished spectacle lens. For example, a minimum eye rotation angle 12 that shall be preserved concerning the optical properties of the back surface may be provided, however, that is not necessary. Further, a carrier point or design reference point is determined on the back surface. Just as an example, the carrier point may be the geometrical center of the ophthalmic lens. The carrier point may also be at or behind the fitting cross of the ophthalmic lens. The carrier point may also be shifted nasally. Just as an example, when viewed in a direction corresponding to that of a standard boxed system the carrier point may be shifted nasally from the prism reference point, in particular by 10 mm. The plane in which the nasal shift is measured may alternatively be defined as a plane tangential to the geometric center of the back surface of the lens. The periphery of the uncut finished spectacle lens may have the form of a circle or an ellipse.

Then, in a step 104, a first boundary line 18 is determined. In particular, a curvature profile of the original shape of the back surface is to be preserved within the first boundary line 18. Further in particular, the carrier point 14 is set on the back surface, in the given example in the geometrical center, and a first boundary line 18 on the back surface is determined, in particular when a curvature profile of the original shape of the back surface is to be preserved within the first boundary line 18. Hence, as shown in the upper right to FIG. 2, the first boundary line 18 will usually be drawn to enclose the intended minimum eye rotation angle 12. The first boundary line 18 encloses a domain of transition points at the back surface of rays for the viewing eye. More exactly the points of this domain refer to all rays for a viewing angle of the eye of up to 12 degree. The shape of the boundary line may be chosen to be identical to the shape of the frame into which the final lens is to be inserted. However, it may also be a circle as shown in further examples. Within the first boundary line 18, the curvature profile of the original lens shape 10 is to be preserved. The rest of the original lens shape of the back surface can be considered cut off. Hence, only a dashed line 26 of the original periphery is shown. The lens shape will now be determined by adding carrier lines or carrier curves extending radially outwards from the prescription zone 20. In a transition portion or transition zone 24, a desired constant curvature gradient is set in later step 108 for each carrier line so that the curvature will transition from the curvature of the preserved lens shape within boundary line 18 towards a constant curvature in the margin portion 28. Hence, a second boundary line 22 can be considered to be the outer boundary of the transition zone 24 with the boundary line 18 being the inner boundary line of the transition zone 24. Hence, in step 106, there is determined a carrier point on the back surface within the prescription zone and a plurality of carrier lines each extending from the carrier point straight into a respective radial direction. Each straight carrier line 30 to 37 runs in a different angle φ. As in the given example the periphery of the uncut finished spectacle lens 10 has the form of a circle, each carrier line runs in a plane that cuts through the full diameter of this circle. As in the given example the front surface has a spherical shape, and the carrier point 14 as in the geometrical center, each carrier line 30 to 37 runs in a meridian of the front surface. In the provided example, eight carrier lines are used so that a separation angle φ between them is 45 degrees. However, any different number of carrier lines could be used, for example 128, 180 or 360.

However, the transition zone 24, the margin portion 28 and that outer boundary line 22 are fixedly determined by a constant width of transition zone 24 or length of the transition zone along each carrier line. Each carrier line extends straight from the carrier point radially outwards.

In a next step 108, for each carrier line, a desired constant curvature gradient in the transition zone is set. This constant curvature gradient is in the direction of the respective carrier line.

In step 110, for each carrier line, a curvature profile of the back surface between the first boundary line and an outer edge the lens blank along the carrier line is determined, wherein a curvature along the carrier line between the second boundary line and the outer edge is constant and equals the curvature along the carrier line in the transition zone at the second boundary line, and wherein the curvature profile in the transition zone is determined based on the respective desired constant curvature gradient. In FIG. 2, a mere resulting example surface is shown in the picture in the middle right.

On the first boundary line 18, the curvature of the new curvature profile within the plane of the straight carrier line, that is, in the given example the tangential or radial curvature, equals the curvature of the optically preserved surface area of the original lens shape 10 within the boundary line 18. That means that curvatures inside and outside the boundary line equal each other approaching the boundary line 18. Hence, the curvature along the first boundary line 18 is preferably determined to be continuous. That means preferably no kink is provided at the boundary line 18.

The curvature profile of the predetermined shape within the boundary line 18 is fixed with the new curvature profiles outside the boundary line 18 attached to it. In the straight view in the back surface, hence in this stage the determined and fixed back surface profile looks like a "spider" with the optically preserved curvature profile within the boundary line 18 being the body and each new curvature profile along a carrier line forming one leg. This description of the back surface may already be sufficient for manufacturing the ophthalmic lens.

However, in an optional further step, for subsequent manufacturing and to provide for angular smoothing, a complete description of the back surface may be provided. Hence, the method may further comprise steps to provide for angular smoothing of the back surface radially outwards of the first boundary line. First, a series of coefficient values of corresponding coefficients of a respective function describing each carrier line in the transition zone may be formed, in particular of the cubic polynomials of each carrier line. Then, for each corresponding coefficient, a first Fourier series of a first order approximating the series of coefficient values may be determined to obtain a first set of Fourier series each dependent on an angle around the carrier point, the first set of Fourier series describing any carrier line in a radial direction for given angle. Even further, for each coefficient, a second Fourier series of a second order approximating the series of coefficient values may be determined, to obtain a second set of Fourier series each dependent on an angle around the carrier point, the second set of Fourier series describing any carrier line in a radial direction for given angle, wherein the second order is higher than the first order, and wherein the second set of Fourier series is applied at the first boundary line. Then, the second set of Fourier series may be blended into the first set of Fourier series radially outwards over a blending zone, in particular so that only the first set of Fourier series is applied beyond the blending zone. In particular, blending may be conducted via the following formula $Z=Z_2(A,R)+W(R)\cdot(Z_1(A,R)-Z_2(A,R))$, wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle and the radial distance based on the second set of Fourier series, and wherein W(R) is a quintic blending polynomial, in particular wherein $W(R)=10\cdot t^3-15\cdot t^4+6\cdot t^5$, wherein $$t = \frac{(R-RD)}{\text{delta}},$$

and wherein RD is the radial distance between the first boundary line and the carrier point at the angle A, and wherein delta is the width of the blending zone, in particular wherein delta is 0.6 times the radial distance between the first boundary line and the carrier point at the angle A.

For minus-lenses, the method could then already end here. However, it may be necessary to further readjust the sagittal height of the fixed curvature profile within the boundary line in case of a plus lens. In case the reduced lens thickness should be considered significant so that, due to the reduced thickness and the conditions of a real lens, the optical properties within the boundary line 18 may be deteriorated, an optimization step may be conducted that starts on the original lens shape of the back surface and readjusts it to restore the optical properties of the original lens shape.

Figure 3:
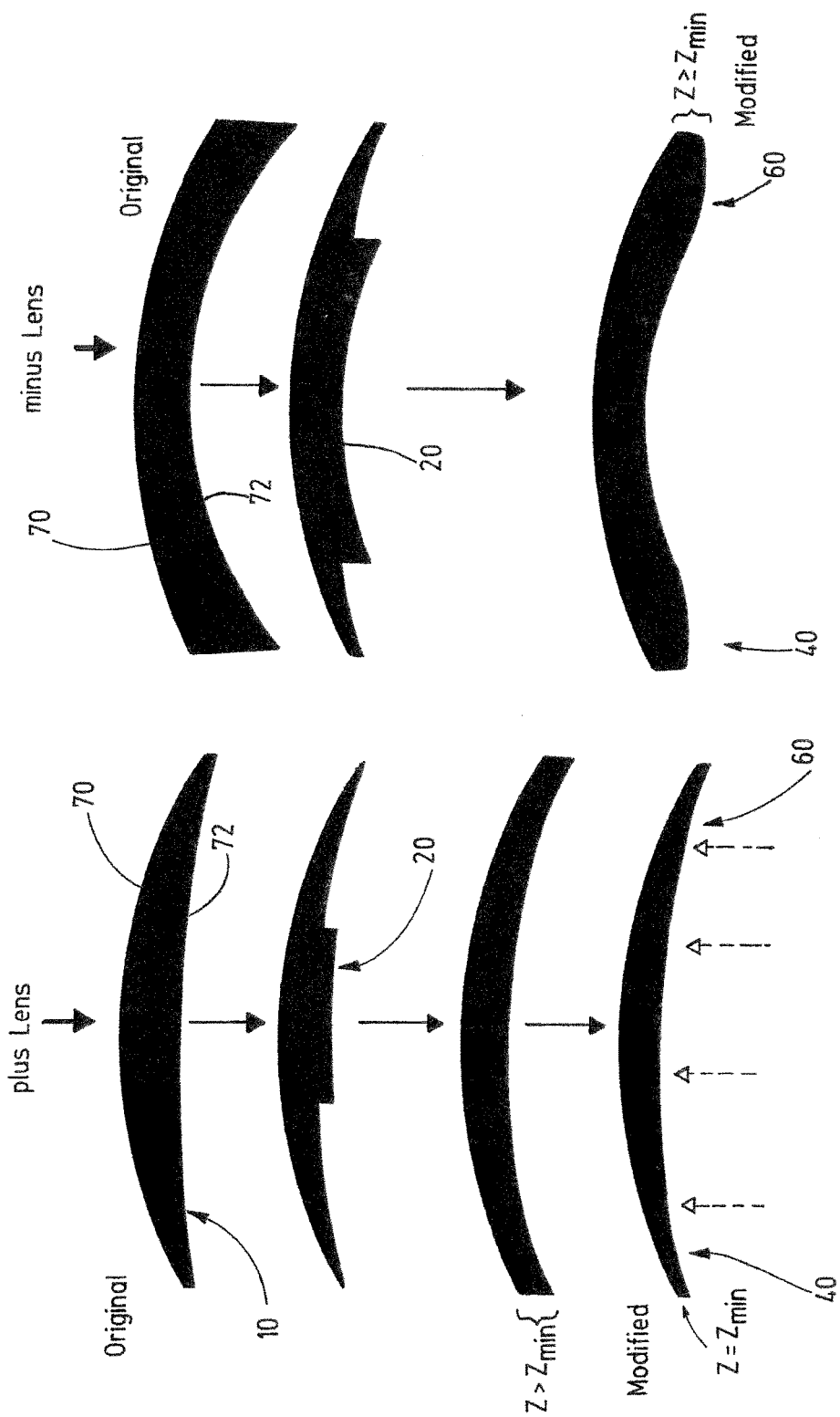
FIG. 3 shows a further general simplified diagram showing and illustrating the different steps of the method for plus lenses and for minus lenses.

FIG. 3 shows further simplified illustrations to generally show the development of the lens shape through the method. FIG. 3 is generally independent of FIG. 2. In the left column, the development of a shape of a plus lens is shown. In the right column, the development of a shape of a minus lens is shown.

Concerning the plus lens, from top to bottom, a predetermined lens shape 10 of an uncut finished spectacle lens 60 having a front surface 70 and a back surface 72 is provided, wherein the predetermined lens shape 10 comprises an predetermined shape of the front surface 70 and an predetermined shape of the back surface 72 of the uncut finished spectacle lens 60, such that the uncut finished spectacle lens 60 satisfies predetermined optical properties. Then, a first boundary line 18 on the back surface 72 is determined, wherein a curvature profile 20 of the predetermined shape of the back surface 72 is to be preserved within the first boundary line 18. Then, a carrier extension 38 of the back surface 72 between the first boundary line 18 and an outer edge 16 of the uncut finished spectacle lens 60 is determined, wherein a curvature of the carrier extension 38 at the first boundary line 18 may equal the boundary curvature. In case of the plus lens, the predetermined lens shape 10 provides for a positive focal power. Hence, a lens shape 40 of the uncut finished spectacle lens 60 is determined, wherein the modified lens shape 40 comprises the predetermined shape of the front surface 70, and a modified shape of the back surface 72. This leads to the new curvature profile of the back surface being determined which then may be moved towards the front surface until a thickness requirement is fulfilled.

Concerning the minus lens, from top to bottom, an predetermined lens shape 10 of an uncut finished spectacle lens 60 having a front surface 70 and a back surface 72 is provided, wherein the predetermined lens shape 10 comprises an predetermined shape of the front surface 70 and an predetermined shape of the back surface 72 of the uncut finished spectacle lens 60, such that the uncut finished spectacle lens 60 satisfies predetermined optical properties within the prescription zone. Then, a first boundary line 18 on the back surface 72 is determined, wherein a curvature profile of the predetermined shape of the back surface 72 is to be preserved within the first boundary line 18. Then, a new curvature profile 38 of the back surface 72 between the first boundary line 18 and an outer edge 16 of the uncut finished spectacle lens 60 is determined, wherein a curvature of the new curvature profile 38 at the first boundary line 18 may equal the boundary curvature. In case of the minus lens, the predetermined lens shape 10 provides for a negative focal power. A sagittal height of the fixed curvature profile of the predetermined lens shape 10 of the back surface 72 within the first boundary line 18 is maintained or preserved. Hence, the thickness of the modified shape is reduced. Hence, a modified lens shape 40 of the uncut finished spectacle lens 60 is determined, wherein the modified lens shape 40 comprises the predetermined shape of the front surface 70, and a modified shape of the back surface 72 with carrier extensions. This leads to the new curvature profile of the back surface being determined.

Figure 4:
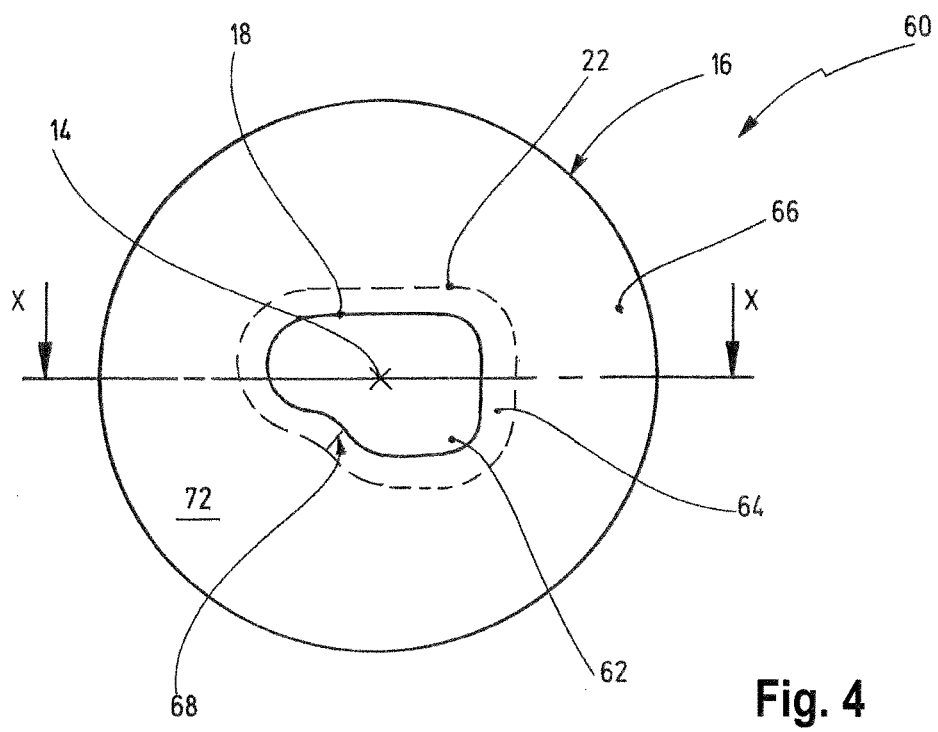
FIG. 4 shows an embodiment of an ophthalmic lens, in particular an uncut finished spectacle lens.

FIG. 4 shows an uncut finished spectacle lens or ophthalmic lens 60. It has a periphery or outer edge 16 which can be circular or elliptical, in the example of FIG. 4 it is circular. The carrier point can then be the geometrical center 14 as explained above. On the back surface shown in FIG. 4, the first boundary line 18 covers a preserved area 62 which is surface area of the back surface within the first boundary line 18 which has a free-form surface, that is, a surface curvature profile that has no symmetries. It is neither point nor plane nor rotationally symmetric. Between a margin portion 66 and the prescription zone 20, there is a transition zone 64 having a length or width 68. The length or width of the transition zone is set to be constant, that is, the length is the same in any radial direction from carrier point 14.

Figure 5:
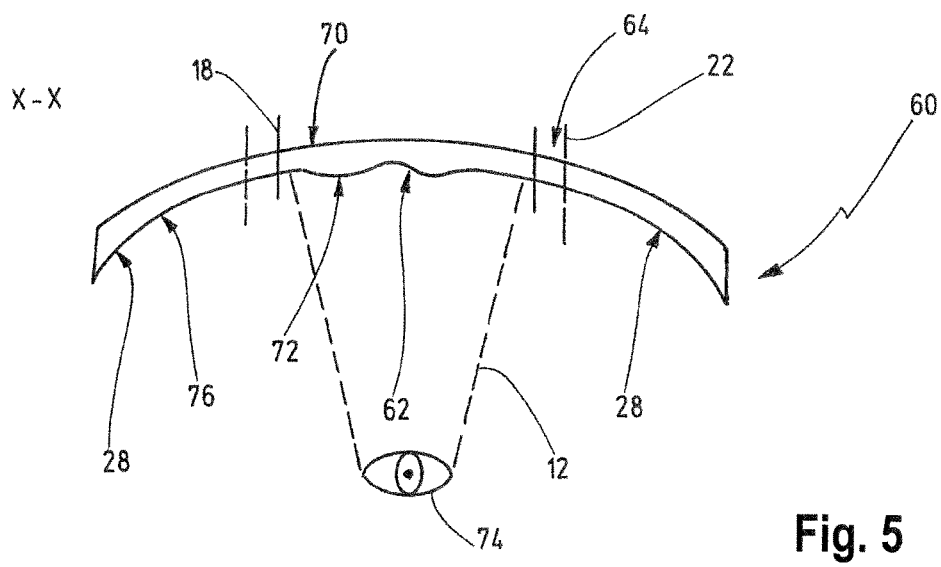
FIG. 5 shows the uncut finished spectacle lens of FIG. 4 along a section line X-X.

FIG. 5 shows a section along line X-X in FIG. 4. A front surface of the uncut finished spectacle lens is spherical. Hence, it is rotationally symmetric with respect to the geometrical center and has a single curvature. The back surface is designated with reference numeral 72. The first boundary line 18 is chosen so that the minimum eye rotation angle 12 is within the boundary line 18. In other words, the first boundary line 18 is chosen so that for all rays through the eye for a viewing angle of the eye of less or equal 12 degree the corresponding intersection points of the rays through the back surface are within the boundary line 18. The eye 74 may be determined with its center of rotation according to the standard eye used for calculations. The ophthalmic lens 60 comprises a front surface and a back surface, wherein the front surface is a convex rotationally symmetric surface, and wherein the back surface comprises a prescription zone which is asymmetric, a margin portion and a transition zone located between the prescription zone and the margin portion, and wherein a curvature gradient of the back surface along a straight line emanating from a point on the back surface is constant within the transition zone, and wherein the transition zone has the same length along any straight line emanating from the point, in particular wherein the length is measured parallel to a plane tangential to a vertex point of the front surface or a plane tangential to the back surface at the geometric center of the back surface of the lens.

Figure 6:
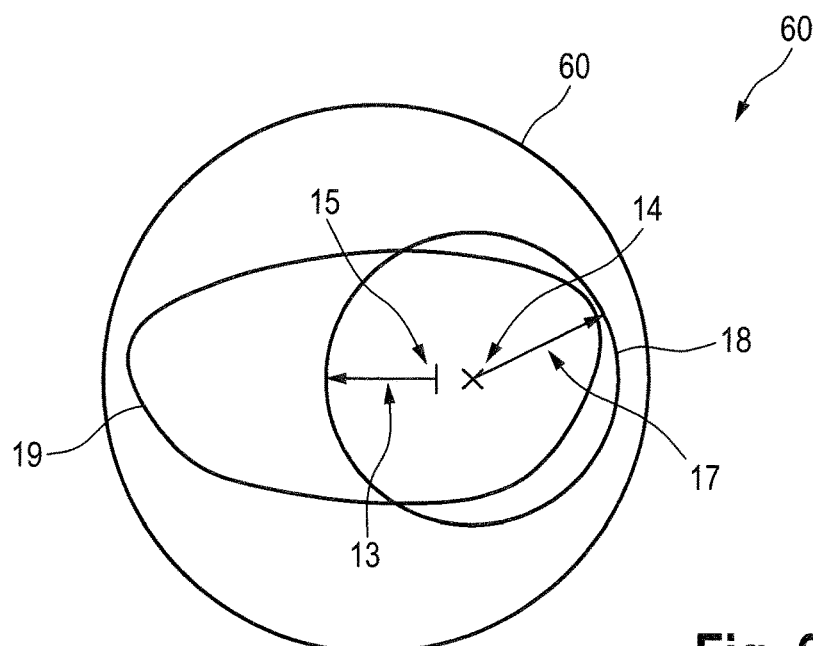
FIG. 6 shows another embodiment of an ophthalmic lens, in particular an uncut finished spectacle lens.
Figure 7:
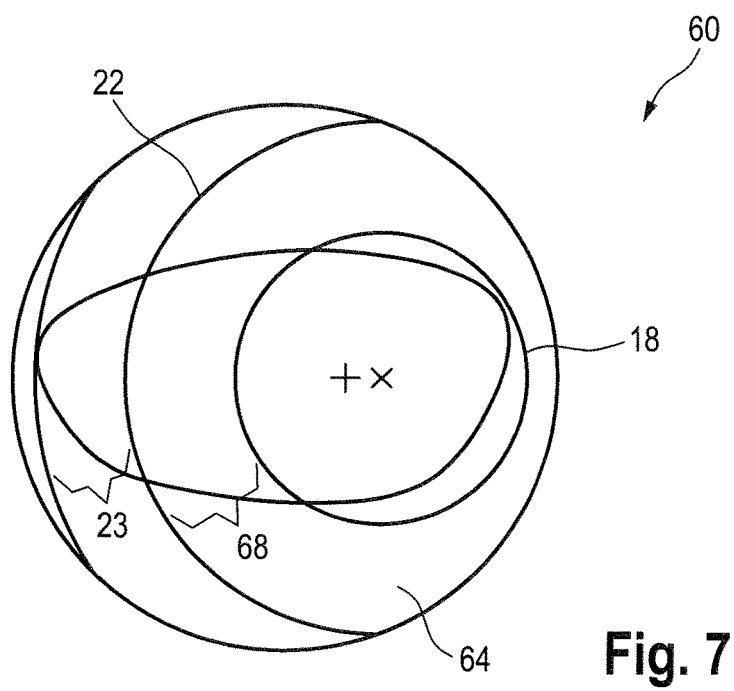
FIG. 7 shows the embodiment of FIG. 6 and the different zones of the design.
Figure 8:
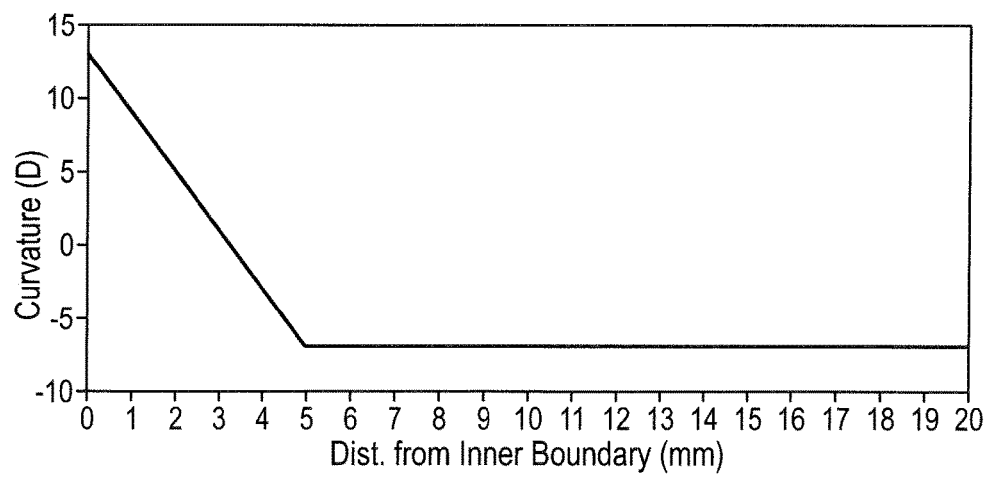
FIG. 8 shows an example of the development of the curvature in a radial direction at a certain angle of the embodiment in FIGS. 6 and 7.

With reference to FIGS. 6 to 8, further principles of the determination of the carrier lines within the transition zone are described.

In general, it may be started with the back surface of the ophthalmic lens, a frame outline 19, and the location of a fitting cross 15. First, the radius and center of the inner boundary line 18 may be determined. It may be provided that the first boundary line 18 does not intersect the frame line 19 on the nasal side as shown in FIG. 6. A distance 13 to the first boundary line 18 may be measured from the fitting cross 15 along the 180 meridian. A center and radius of a circle describing the inner boundary line 18 may be determined to satisfy a distance requirement to the inner boundary from the fitting cross and should not intersect the frame line 19 on the nasal side.

Once the first boundary line 18 is defined the change to the surface in the transition zone 64 has to be determined and applied. Then from the second boundary line 22 of the transition zone 64 until at least the edge of the frame the radial curvature should be held constant. This circular extension can continue to the edge of the uncut finished spectacle lens. FIG. 7 shows the relevant regions and boundaries.

A general approach to providing the desired constant curvature gradient is to construct a piece-wise cubic polynomial for the transition zone, rather than a single global single cubic polynomial. This removes the difficulty of achieving the desired gradient, and can be determined directly. The one-dimensional curvature is given by $$C = \frac{Z_{xx}}{(1+Z_x^2)^{3/2}}$$

where $Z_x$, and $Z_{xx}$ are the first and second derivatives of the surface height in the direction of the respective carrier line. Then the gradient G is just the derivate of C $$G = \frac{Z_{xxx}}{(1+Z_x^2)^{3/2}} - \frac{3Z_x Z_{xx}^2}{(1+Z_x^2)^{5/2}}.$$

For the initial condition one can use the slope S, curvature C, and gradient G, and set Z to zero. The corresponding value of the optical zone at the first boundary line may be used as an alternative. Then for the first interval it is $$Z = a_0 + b_0 x + c_0 x^2 + d_0 x^3$$

where $$a_0 = 0, \ b_0 = s, \ c_0 = C(1+b_0^2)^{3/2}/2$$

Further, in the first interval $$Z_x = b_0, \ Z_{xx} = 2c_0, \ Z_{xxx} = 6d_0.$$

So the equation for G becomes $$G = \frac{6d_0}{(1+b_0^2)^{3/2}} - \frac{12b_0 c_0^2}{(1+b_0^2)^{5/2}}$$

or $$d_0 = \left(G(1+b_0^2)^{3/2} + 12b_0 c_0^2/(1+b_0^2)\right)/6.$$

Now, the carrier line function can be developed in small steps. So if in general it is written for the $i^{th}$ interval $$Z_i = a_i + b_i \Delta x + c_i \Delta x^2 + d_i \Delta x^3$$

where $\Delta x = x - x_i$, then $$a_{i+1} = a_i + b_i \Delta x + c_i \Delta x^2 + d_i \Delta x^3$$

$$b_{i+1} = b_i + 2c_i \Delta x + 3d_i \Delta x^2,$$

$$c_{i+1} = c_i + 3d_i \Delta x$$

$$d_{i+1} \cong (G(1+b_{i+1}^2)^{3/2} + 12b_{i+1} c_{i+1}^2/(1+b_{i+1}^2))/6.$$

This may be solved by numerical integration. The idea being that the output series would be represented by a standard cubic spline. Past the end and radially outwards of the transition zone the curvature gradient may be set to zero, which produces a constant curvature function past the second boundary line. Optionally, if the slope of the function exceeds a boundary value, the function may be extended with a quadratic polynomial past that point, to prevent the curve from becoming too step.

FIG. 8 shows the one-dimensional curvature for a carrier line that starts at 13 diopters with a gradient of −4 diopters/mm over a length of 5 mm. The function is a cubic spline made from 1 mm steps of the numerically integrated function. The final curvature after the transition zone is about −6.97 diopters.

Figure 9A:
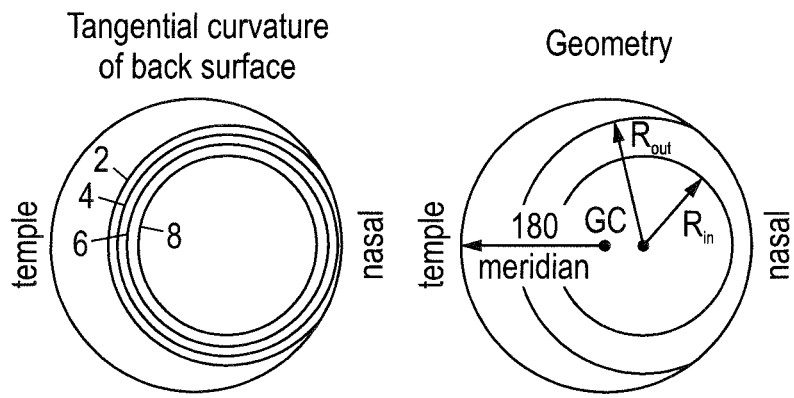
FIG. 9A shows another embodiment of an ophthalmic lens, in particular an uncut finished spectacle lens.
Figure 9B:
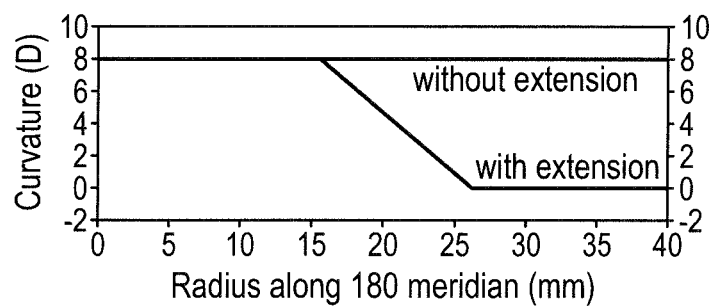
FIG. 9B shows an example of the development of the curvature in a radial direction at a 180 degree meridian of the embodiment in FIG. 9A.
Figure 9C:
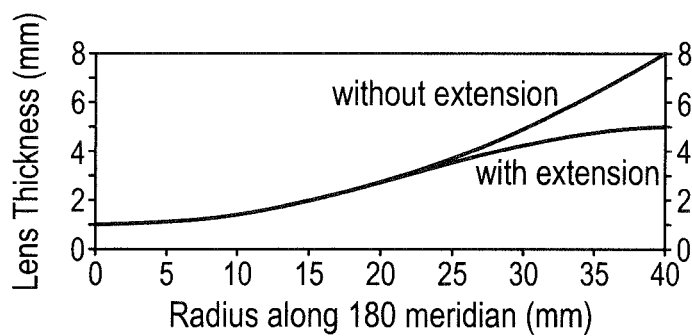
FIG. 9C shows an example of the development of the thickness in a radial direction at a 180 degree meridian of the embodiment in FIG. 9A.

FIGS. 9A to 9C show a simple example of an ophthalmic lens 60 which may be an uncut finished spectacle lens. This example is intended to be a simple single vision example of the carrier extension. The lens prescription is −5 diopters, the front surface is a 3.5 diopter in refractive index 1.530 sphere, the material index is 1.586, and the back surface at the geometric center is 8.02 diopters in index 1.530. In general, throughout the application, the curvatures in diopters are given with a refractive index of 1.53 as a reference value and independent of the refractive index of the material actually used. Hence, in case a curvature is given in diopters, the corresponding curvature in radius can be calculated by $$r = \frac{1.53-1}{\text{diopters}}.$$

This will provide for the radius in meters. This recalculation is well known to persons skilled in the art with a known refractive index which is 1.53 throughout the application. The full diameter of the blank shown is 80 mm. The first boundary line 18 is an inner radius of the extension $R_{in}$ is 25 mm, and the second boundary line 22 is an outer radius $R_{out}$ is 35 mm. The center of the circular extension boundaries are displaced by 10 mm to the nasal side of the geometric center of the lens blank. The gradient of the tangential curvature in the ring between $R_{in}$ and $R_{out}$ is −0.8 diopters/mm. This gradient takes the tangential curvature from just over eight diopter at the inner boundary down to just over zero diopters at the outer boundary. The thickness of the lens normal to the front surface at the temporal edge of the blank would be about 8 mm without the extension; with the carrier extension that is reduced to under 5.0 mm.

Figure 10A:
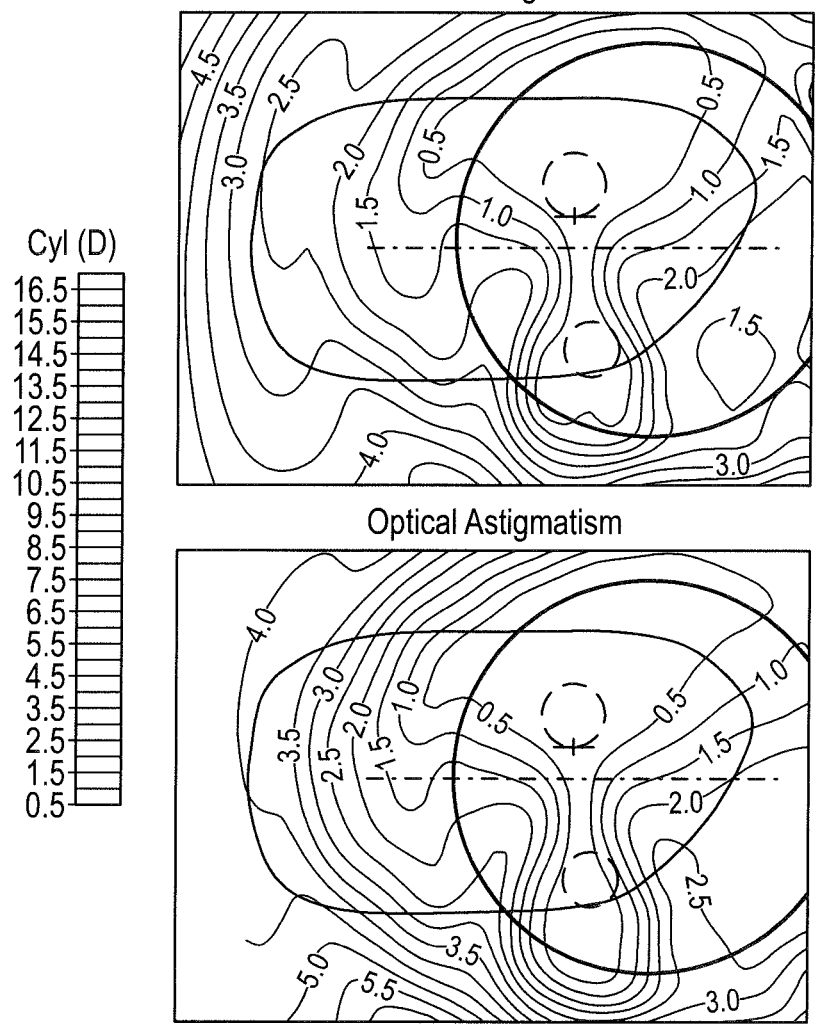
FIG. 10A shows surface and optical astigmatism in an example minus lens provided according to the method for angular smoothing of a surface determined by carrier lines.

The example in FIG. 10A illustrates an implementation of the carrier extension on a single progressive lens design having distance prescription of −3.00 diopters with addition power of +2.50 diopters. The center of the carrier extension ring $(x_o, y_o)$ is at (10,0), decentered 10 mm nasally from the prism reference point. The inner radius of the first boundary line is 25 mm and the outer radius of the second boundary line is 40 mm. The rate of change of curvature variation or curvature gradient in the ring is fixed to −0.25 D/mm. The contour plots in FIG. 10A illustrate the surface astigmatism and the residual optical astigmatism with the frame outline overlayed. The frame box dimensions are 64×36 mm, bridge width 18 mm, pantoscopic tilt is 5°, frame wrap angle 15°, wearer monocular pupil distance is 32 mm, fitting height of 21 mm. The thick ring shows the location of the first boundary line.

Figure 10B:
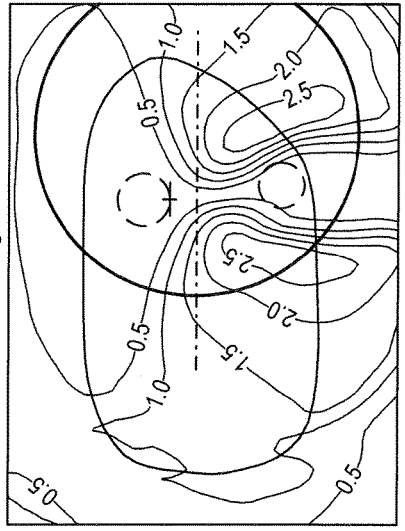
FIG. 10B shows surface and optical astigmatism in an example plus lens provided according to the method for angular smoothing of a surface determined by carrier lines.
Figure 10B:
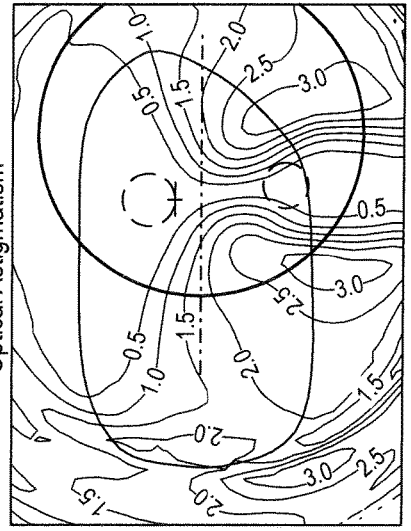
Figure 10B:
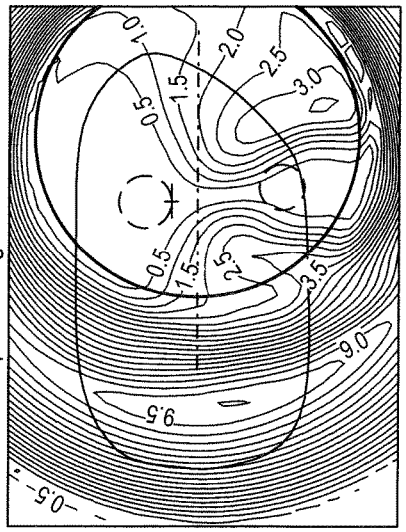
Figure 10B:

The example in FIG. 10B illustrates an implementation of the carrier extension on a single progressive lens design having distance prescription of +3.00 diopters with addition power of +2.50 diopters. The center of the carrier extension ring $(x_o, y_o)$ is at (10,0), decentered 10 mm nasally from the prism reference point. The inner radius of the first boundary line is 25 mm and the outer radius of the second boundary line is 40 mm. The rate of change of curvature variation or the curvature gradient in the ring is fixed to −0.507 D/mm. The contour plots in FIG. 10B illustrate the surface astigmatism and the residual optical astigmatism with the frame outline overlayed. The frame box dimensions are 64×36 mm, bridge width 18 mm, pantoscopic tilt is 5°, frame wrap angle 15°, wearer monocular pupil distance is 32 mm, fitting height of 21 mm. The thick ring shows the location of the first boundary line. The center thickness of this lens is 4.21 mm and the edge thickness around the perimeter of the frame shown in FIG. 10B varies from 1.0 mm to 3.5 mm. For comparison, the same lens without the carrier curve is shown. It has the center thickness of 7.21 mm, while the edge thickness around the perimeter of the same size and shape frame varies from 1.0 mm to 6.5 mm. The carrier curve had the effect of reducing the center thickness by 3 mm, as well as reducing the maximum edge thickness by the same amount with a much more uniform edge thickness profile.

Figure 11:
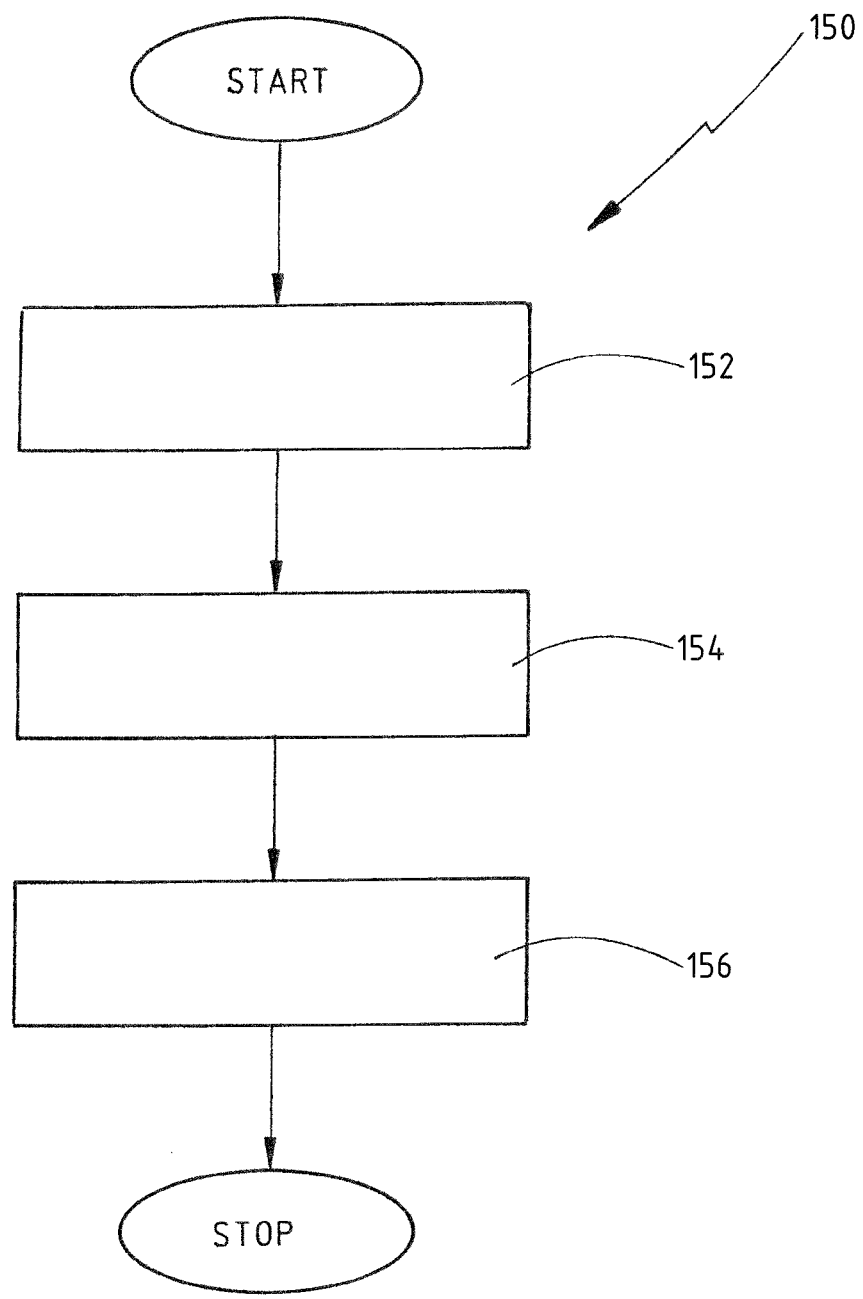
FIG. 11 shows an embodiment of a method for angular smoothing of a surface determined by carrier lines.

In FIG. 11, a method 150 for angular smoothing of a surface determined by carrier lines radially outwards of a prescription zone bordered by a first boundary line.

In step 152, a plurality of carrier lines each extending from a carrier point in the prescription zone, in particular straight, into a respective radial direction may be provided, wherein a curvature profile of the surface in a direction along each carrier line radially outwards of the prescription zone has at least one section, wherein the curvature profiles of corresponding sections of each carrier line are provided by corresponding polynomials, In step 154, a series of coefficient values of corresponding coefficients of the polynomials of each carrier line may be formed.

In step 156, for each corresponding coefficient, a first Fourier series of a first order approximating the series of coefficient values may be determined to obtain a first set of Fourier series each dependent on an angle around the carrier point, the first set of Fourier series describing any carrier line in a radial direction for a given angle.

In further refinements, for each coefficient, a second Fourier series of a second order approximating the series of coefficient values may be determined to obtain a second set of Fourier series each dependent on an angle around the carrier point, the second set of Fourier series describing any carrier line in a radial direction for given angle, wherein the second order is higher than the first order, and wherein the second set of Fourier series is applied at the first boundary line. The second set of Fourier series may then be blended into the first set of Fourier series radially outwards over a blending zone, in particular so that only the first set of Fourier series is applied beyond the blending zone.

In particular, blending may be conducted via the following formula:

$$Z=Z_2(A,R)+W(R)\cdot(Z_1(A,R)-Z_2(A,R)),$$

wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle A and the radial distance R based on the second set of Fourier series, and wherein W(R) is a quintic blending polynomial, in particular wherein $$W(R)=10\cdot t^3-15\cdot t^4+6\cdot t^5,$$

wherein $$t = \frac{(R-RD)}{\text{delta}},$$

and wherein RD is the radial distance between the first boundary line and the carrier point at the angle A, and wherein delta is the width of the blending zone, in particular wherein delta is 0.6 times radial distance between the first boundary line and the carrier point at the angle A.

Figure 12:
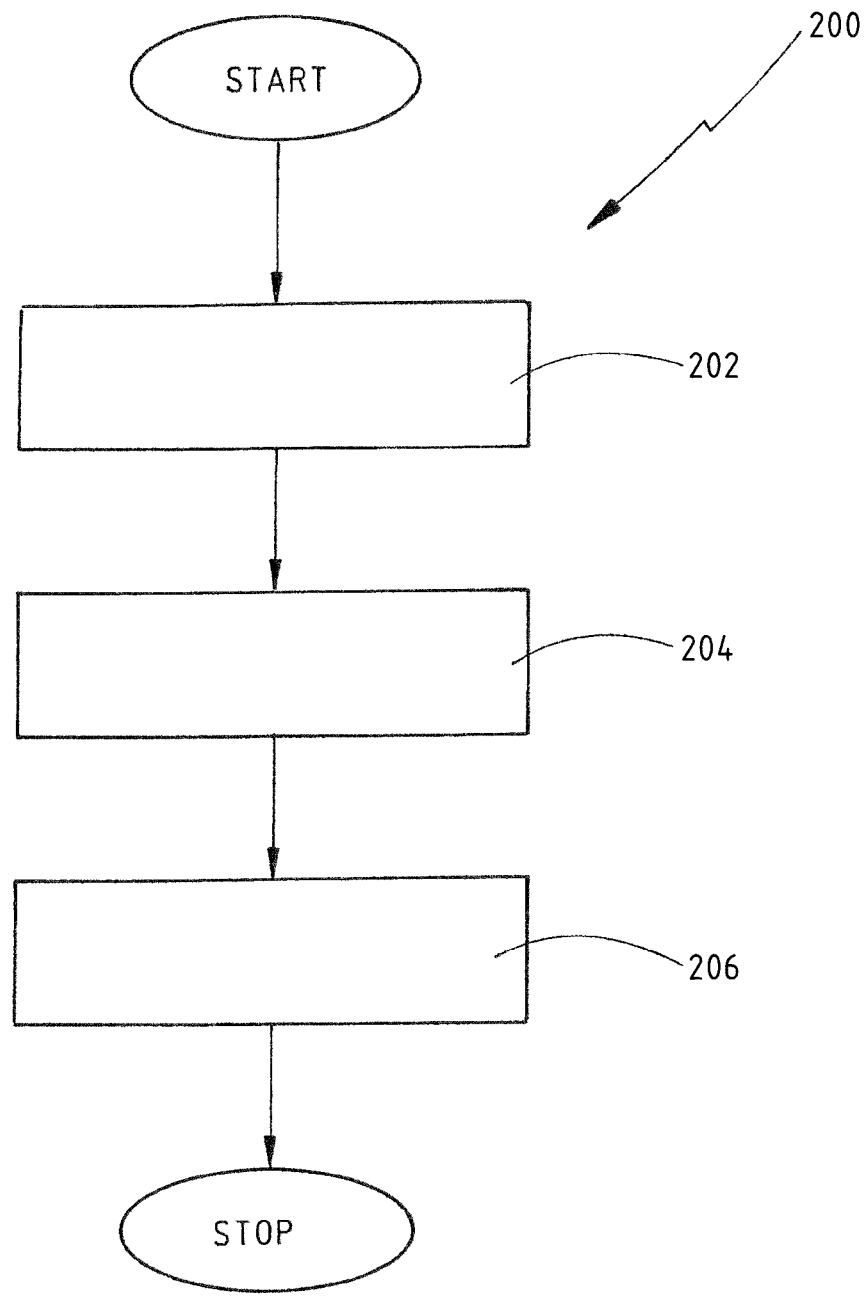
FIG. 12 shows an embodiment of a method for minimizing the difference in thickness between two ophthalmic lenses for the same spectacles; and, FIG. 13 shows a block diagram of an embodiment of a manufacturing method.

In FIG. 12, a method 200 for minimizing the difference in thickness between two ophthalmic lenses for the same spectacles is shown. It comprises providing 202, for each ophthalmic lens, an original lens shape satisfying predetermined optical properties over the complete back surface and a modified lens shape having a front surface and a back surface, wherein the modified lens shape comprises a predetermined shape of the front surface and a predetermined shape of the back surface within a prescription zone of the back surface bordered by a first boundary line, such that the ophthalmic lens satisfies the predetermined optical properties within the prescription zone, and an extension of the back surface radially outwards of the prescription zone by carrier lines.

Then, in step 204, the modified lens shape of the ophthalmic lens having a smaller maximum thickness is adapted by replacing the back surface by a combination of the original lens shape and the modified lens shape according to $$CS=OS+A\cdot(MS-OS)$$

wherein CS is the sagittal height of the combined back surface, OS is the sagittal height of the back surface of the original lens shape, MS is the sagittal height of the back surface of the modified lens shape and A is a value from and including 0 to and including 1.

Then, in step 206, parameter A may be optimized so that the difference in thickness between the two ophthalmic lenses is minimized.

In practice, carriers extensions could be applied for both lenses of the spectacle frame if for either lens the edge thickness exceeds, for example, 5 mm at any point outside the first boundary line or outside the frame line or frame boundary. When carrier lines have been determined for minus lenses, then the maximum edge thickness may be determined for both lenses. If the difference is greater than a specified threshold (for example, 1 mm), then, to balance the edge thickness of the lenses for the right and left eyes, the extension for the thinner lens is modified as explained above.

The determination may result in lens edge thicknesses maps for a pair of lenses having very different prescriptions in the right and left eyes, for example, right eye −4.00 diopters sphere, left eye: −2.00 diopters sphere/−2.00 diopters cylinder at 150° and +2.50 diopters addition with maximum temporal edge thickness balancing may result in both lenses having a maximum temporal edge thickness of 7.55 mm.

Figure 13:
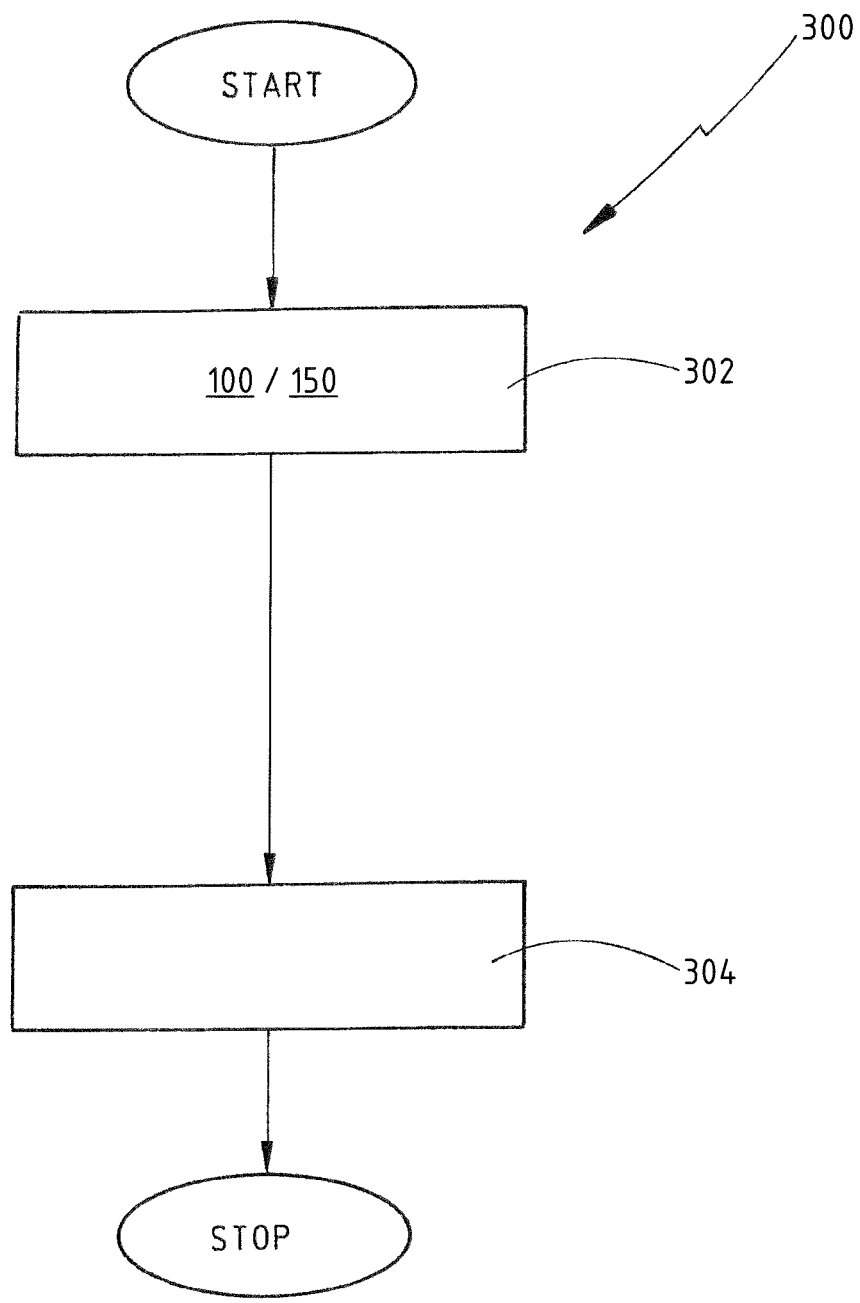

Finally, FIG. 13 shows a method for manufacturing generally designated by reference numeral 300. After the start, a method 100 according to the first aspect and/or a method 150 according to the third aspect is conducted in step 302. Afterwards, based on the modified lens shape, a manufacturing step 304 would take place that manufactures the uncut finished spectacle lens 60. Subsequently, the uncut finished spectacle lens 60 could be further processed, in particular in an edging process that cuts the lens out of the uncut finished spectacle lens towards its final shape that in particular may then be shipped towards an ophthalmic dispenser. The method may then end.

Further, the current invention comprises embodiments according to the following clauses:

Clause 1. A computer-implemented method (100) for providing a lens shape for an ophthalmic lens (60), comprising the following steps:
  a) providing (102) a predetermined lens shape of an ophthalmic lens (60), in particular an uncut finished spectacle lens, having a front surface and a back surface, wherein the predetermined lens shape comprises a predetermined shape of the front surface and a predetermined shape of the back surface within a prescription zone (20) of the back surface bordered by a first boundary line (20), such that the ophthalmic lens (60) satisfies predetermined optical properties within the prescription zone (20);
  b) determining (104) a carrier point on the back surface within the prescription zone (20) and a plurality of carrier lines each extending from the carrier point into a respective direction;
  c) determining (106) a transition zone (24) of the back surface, wherein the transition zone (24) extends radially outwards from the first boundary line (18) towards the outer edge (60) of the ophthalmic lens (60) and ends at a second boundary line (22) bordering the transition zone radially outwards;
  d) for each carrier line (30-37), setting (108) a desired constant curvature gradient in the transition zone (24), in particular wherein the desired constant curvature gradient is different from zero;
  e) for each carrier line (30-37), determining (110) a curvature profile of the back surface between the first boundary line (18) and an outer edge the ophthalmic lens (60) along the carrier line (30-37), and wherein the curvature profile in the transition zone (24) is determined based on the respective desired constant curvature gradient.

Clause 2. The method according to clause 1, characterized in that a curvature along the carrier line (30-37) between the second boundary line (22) and the outer edge is essentially constant, in particular constant, and equals the curvature along the carrier line (30-37) in the transition zone (24) at the second boundary line (22).

Clause 3. The method according to clause 1 or 2, characterized in that the desired constant curvature gradient is set based on the curvature of the prescription zone (20) at the first boundary line (18) and a boundary condition for the curvature within the transition zone (24), in particular wherein the curvature gradient is further set based on a desired thickness reduction of the ophthalmic lens (60) along the carrier line (30-37).

Clause 4. The method according to clause 1 or 2, characterized in that the desired constant curvature gradient is set based on the curvature of the prescription zone (20) at the first boundary line (18) and a curvature target to be reached at the second boundary line (22), and wherein the curvature target is zero and/or a curvature of the front surface, in particular wherein the curvature of the front surface is determined in the same coordinate system as the curvature of the back surface, and in particular wherein the front surface is a spherical surface.

Clause 5. The method according to any of clauses 1 to 4, characterized in that the curvature gradient is set to be negative in case the ophthalmic lens (60) is a minus lens and the curvature gradient is set to be positive in case the ophthalmic lens (60) is a plus lens.

Clause 6. The method according to any of clauses 1 to 5, characterized in that the curvature profile is determined by determining a cubic spline from the first boundary line (18) to the second boundary line (22), wherein the cubic spline is comprised of a plurality of sections each described by a cubic polynomial, and wherein the cubical polynomials are determined section-wise from the first boundary line (18) to the second boundary line (22), in particular such that a sagittal height, a slope and a curvature of the back surface along the carrier line (30-37) are continuous and the curvature along the carrier line (30-37) changes over each section resulting in an approximated constant curvature gradient over the transition zone (24).

Clause 7. The method according to any of clauses 1 to 5, characterized in that the curvature profile is determined by determining a cubic spline from the first boundary line (18) to the second boundary line (22), wherein the cubic spline is comprised of a plurality of sections each described by a cubical polynomial, and wherein the cubical polynomials are determined section-wise from the first boundary line (18) to the second boundary line (22) such that a sagittal height, a slope and a curvature of the back surface along the carrier line (30-37) are continuous and the curvature gradient is reset to the desired constant curvature gradient for each polynomial at the radially inwards end of each section.

Clause 8. The method of any of clauses 1 to 7, characterized in that a length (68) of the transition zone (24) along each carrier line (30-37) is constant resulting in the second boundary line (22) bordering the transition zone (24) radially outwards and the second boundary line (22) being radially offset from the first boundary line (18) by the length.

Clause 9. The method according to clause 8, characterized in that the length of the transition zone (24) is within a range of at least 10 mm up to and including 20 mm, in particular 10 mm, 15 mm or 17.5 mm.

Clause 10. The method according to any of clauses 1 to 9, characterized in that the constant curvature gradient has a magnitude in range from and including 0.05 diopters/mm to and including 1.5 diopters/mm.

Clause 11. The method according to any of clauses 6 to 10, characterized in that the length of each section is within a range of at least 0.5 mm up to and including 2 mm, in particular 1 mm.

Clause 12. The method according to any of clauses 1 to 11, characterized in that the method comprises a further step of checking, for each carrier line (30-37), whether a thickness of the spectacle lens at an outer edge and/or at an intended frame line along which the ophthalmic lens (60) is to be edged is above a predefined threshold and, if not, changing, in particular reducing or increasing, the magnitude of the desired constant curvature gradient.

Clause 13. The method according to any of clauses 1 to 12, characterized in that the ophthalmic lens (60) is an uncut finished spectacle lens.

Clause 14. The method according to any of clauses 1 to 13, characterized in that a curvature profile of the predetermined lens shape of the back surface is preserved within the first boundary line (18).

Clause 15. The method according to any of clauses 1 to 14, characterized in that at least a sagittal height of the prescription zone (20) of the back surface transitions continuously at the first boundary line (18) into each carrier line (30-37), preferably wherein further a slope of the prescription zone (20) of the back surface in the direction along the carrier lines (30-37) transitions continuously at the first boundary line (18) into each carrier line (30-37), more preferably wherein further a curvature of the prescription zone (20) of the back surface in the direction along the carrier lines (30-37) transitions continuously at the first boundary line (18) into each carrier line (30-37).

Clause 16. The method according to any of clauses 8 to 15, characterized in that the length is to be measured within a plane parallel to a tangential plane in the carrier point of the back surface.

Clause 17. The method according to any of clauses 1 to 16, characterized in that the carrier point is offset nasally from a prism reference point of the ophthalmic lens (60).

Clause 18. The method according to any of clauses 1 to 17, characterized in that first boundary line (18) is circular and the second boundary line (22) is circular.

Clause 19. The method according to any of clauses 1 to 17, characterized in that the curvature profile along each carrier line (30-37) radially outwards of the second boundary line (22) is determined via a circular arc.

Clause 20. The method according to any of clauses 1 to 19, characterized in that the method comprises a further step of angular smoothing of the back surface radially outwards of the first boundary line (18).

Clause 21. The method according to any of clauses 1 to 20, characterized in that a further step of angular smoothing of the back surface radially outwards of the first boundary line (18) is conducted by flattening a profile of the curvature of the prescription zone (20) in the direction of the carrier lines (30-37) along the first boundary line (18) via approximation by a polynomial or a spline function or a Fourier series to obtain a flattened curvature profile, and wherein the flattened curvature profile is used as a radially inward starting curvature value for each carrier line (30-37).

Clause 22. The method according to any of clauses 1 to 20, characterized in that the method further comprises the following steps to provide for angular smoothing of the back surface radially outwards of the first boundary line (18):
i) forming a series of coefficient values of corresponding coefficients of a respective function describing each carrier line (30-37) in the transition zone (24), in particular of the cubic polynomials of each carrier line (30-37),
ii) determining, for each corresponding coefficient, a first Fourier series of a first order approximating the series of coefficient values, to obtain a first set of Fourier series each dependent on an angle around the carrier point, the first set of Fourier series describing any carrier line (30-37) in a radial direction for given angle.

Clause 23. The method according to clause 22, characterized in that the method comprises the further steps of:
iii) determining, for each coefficient, a second Fourier series of a second order approximating the series of coefficient values, to obtain a second set of Fourier series each dependent on an angle around the carrier point, the second set of Fourier series describing any carrier line (30-37) in a radial direction for given angle, wherein the second order is higher than the first order, and wherein the second set of Fourier series is applied at the first boundary line (18),
iv) blending the second set of Fourier series into the first set of Fourier series radially outwards over a blending zone, in particular so that only the first set of Fourier series is applied beyond the blending zone.

Clause 24. The method according to clause 23, characterized in that the step of blending is conducted via the following formula:

$$Z = Z_2(A,R) + W(R) \cdot (Z_1(A,R) - Z_2(A,R)),$$

wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle and the radial distance based on the second set of Fourier series, and wherein W(R) is a quintic blending polynomial, in particular wherein $$W(R) = 10 \cdot t^3 - 15 \cdot t^4 + 6 \cdot t^5,$$

wherein $$t = \frac{(R - RD)}{\text{delta}},$$

and wherein RD is the radial distance between the first boundary line (18) and the carrier point at the angle A, and wherein delta is the width of the blending zone, in particular wherein delta is 0.6 times the radial distance between the first boundary line (18) and the carrier point at the angle A.

Clause 25. A method for providing a smoothed extension surface from a plurality of carrier lines (30-37) extending radially outwards of a prescription zone (20), the method comprising the following steps:
- I) providing (152) a plurality of carrier lines (30-37) each extending from a carrier point in the prescription zone (20) into a respective direction, wherein a curvature profile of the surface along each carrier line (30-37) radially outwards of the prescription zone (20) is provided by a cubic spline;
- II) forming (154, 156) a set of truncated Fourier series of a definite order each approximating corresponding spline coefficients for all carrier line directions.

Clause 26. A method for constructing a surface determined by carrier lines (30-37) radially outwards of a prescription zone (20), the method comprising the following steps:
- aa) providing a plurality of carrier lines each extending from a carrier point in the prescription zone into a respective direction, wherein a curvature profile of the surface along each carrier line radially outwards of the prescription zone is provided by a cubic spline;
- bb) forming a first set of truncated Fourier series of a definite high order each approximating corresponding coefficients of a first spline for all carrier line directions,
- cc) forming a second set of truncated Fourier series of a definite low order each approximating corresponding coefficients of a second spline for all carrier line directions,
- dd) determining a third spline sufficient to determine a surface height at any radial location within the range of the carrier lines for any specified carrier line direction by a weighted average of the first spline and second spline for that direction, where the weighting function is a specified polynomial function of the radial distance from the first boundary.

Clause 27. A method (150) for providing a surface determined by carrier lines (30-37) radially outwards of a prescription zone (20) bordered by a first boundary line (18), the method comprising the following steps:
- i) providing (152) a plurality of carrier lines (30-37) each extending from a carrier point in the prescription zone (20) into a respective direction, wherein a curvature profile of the surface in a direction along each carrier line (30-37) radially outwards of the prescription zone (20) has at least one section, wherein the curvature profiles of corresponding sections of each carrier line (30-37) are provided by respective polynomials,
- ii) forming (154) a series of coefficient values of corresponding coefficients of the polynomials of each carrier line (30-37),
- iii) determining (156), for each corresponding coefficient, a first Fourier series of a first order approximating the series of coefficient values, to obtain a first set of Fourier series each dependent on an angle around the carrier point.

Clause 28. The method according to clause 27, characterized in that the method comprises the further steps of:
- iv) determining, for each coefficient, a second Fourier series of a second order approximating the series of coefficient values, to obtain a second set of Fourier series each dependent on an angle around the carrier point, the second set of Fourier series describing any carrier line (30-37) in a radial direction for given angle, wherein the second order is higher than the first order, and wherein the second set of Fourier series is applied at the first boundary line (18),
- v) blending the second set of Fourier series into the first set of Fourier series radially outwards over a blending zone, in particular so that only the first set of Fourier series is applied beyond the blending zone.

Clause 29. The method according to clause 28, characterized in that the step of blending is conducted via the following formula:

$$Z = Z_2(A,R) + W(R) \cdot (Z_1(A,R) Z_2(A,R)),$$

wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle A and the radial distance R based on the second set of Fourier series, and wherein W(R) is a quintic blending polynomial, in particular wherein $$W(R) = 10 \cdot t^3 - 15 \cdot t^4 + 6 \cdot t^5,$$

wherein $$t = \frac{(R - RD)}{\text{delta}},$$

and wherein RD is the radial distance between the first boundary line (18) and the carrier point at the angle A, and wherein delta is the width of the blending zone, in particular wherein delta is 0.6 times radial distance between the first boundary line (18) and the carrier point at the angle A.

Clause 30. A method (300) for manufacturing an ophthalmic lens (60), comprising the steps of providing (302) a lens shape for an ophthalmic lens (60) according to any of clauses 1 to 29, and manufacturing (304) the ophthalmic lens (60) according to the lens shape.

Clause 31. An ophthalmic lens (60), comprising a front surface and a back surface, wherein the front surface is a convex rotationally symmetric surface, and wherein the back surface comprises a prescription zone (20) which is asymmetric, a margin portion (28) and a transition zone (24) located between the prescription zone (20) and the margin portion (28), and wherein a curvature gradient of the back surface along a straight line emanating from a point on the back surface is constant within the transition zone (24).

Clause 32. The ophthalmic lens of clause 31, characterized in that the transition zone (24) has the same length along any straight line emanating from the point, in particular wherein the length is measured parallel to a plane tangential to the point of the back surface.

Clause 33. The ophthalmic lens of clause 32, characterized in that the length of the transition zone (24) is within a range of at least 10 mm up to and including 20 mm, in particular 10 mm, 15 mm or 17.5 mm.

Clause 34. A method (200) for minimizing the difference in thickness between two ophthalmic lenses (60) for the same spectacles, comprising the following steps:
- A) providing (202), for each ophthalmic lens (60), an original lens shape satisfying predetermined optical properties over the complete back surface and a modified lens shape having a front surface and a back surface, wherein the modified lens shape comprises a predetermined shape of the front surface and a predetermined shape of the back surface within a prescription zone (20) of the back surface bordered by a first boundary line (18), such that the ophthalmic lens (60) satisfies the predetermined optical properties within the prescription zone (20), and an extension of the back surface radially outwards of the prescription zone (20) by carrier lines (30-37);

B) adapting (204) the modified lens shape of the ophthalmic lens (60) having a smaller maximum thickness by replacing the back surface by a combination of the original lens shape and the modified lens shape according to $$CS = OS + A \cdot (MS - OS)$$

wherein CS is the sagittal height of the combined back surface, OS is the sagittal height of the back surface of the original lens shape, MS is the sagittal height of the back surface of the modified lens shape and A is a value from and including 0 to and including 1, and C) optimizing A so that the difference in thickness between the two ophthalmic lenses (60) is minimized.

Clause 35. A computer program product comprising program code for carrying out the steps of a method according to any of clauses 1 to 29 or according to clause 34, in particular when the computer program product is run on a data processing device.

Clause 36. A machine readable storage medium having stored thereon a computer program comprising program code for carrying out the steps of a method according to any of clauses 1 to 29 or according to clause 34, in particular when the computer program or the program code is run on a data processing device.

It is understood that the foregoing description is that of the preferred embodiments of the invention and that various changes and modifications may be made thereto without departing from the spirit and scope of the invention as defined in the appended claims.

What is claimed is:

1. A method for manufacturing an ophthalmic lens, wherein the ophthalmic lens comprises a shape determined by the following steps:
   a) providing a predetermined lens shape of an ophthalmic lens having a front surface and a back surface, wherein the predetermined lens shape comprises a predetermined shape of the front surface and a predetermined shape of the back surface within a prescription zone of the back surface bordered by a first boundary line, such that the ophthalmic lens satisfies predetermined optical properties within the prescription zone;
   b) determining a carrier point on the back surface within the prescription zone and a plurality of carrier lines each extending from the carrier point into a respective direction;
   c) determining a transition zone of the back surface, wherein the transition zone extends radially outwards from the first boundary line towards the outer edge of the ophthalmic lens and ends at a second boundary line bordering the transition zone radially outwards;
   d) for each carrier line, setting a desired constant curvature gradient over the transition zone;
   e) for each carrier line, determining a curvature profile of the back surface between the first boundary line and an outer edge the ophthalmic lens along the carrier line, and wherein the curvature profile in the transition zone is determined based on the respective desired constant curvature gradient;
   f) angular smoothing the back surface radially outwards of the first boundary line; and
   g) manufacturing the ophthalmic lens comprising the shape defined by steps a) through f).

2. The method of claim 1, wherein a curvature along the carrier line between the second boundary line and the outer edge is essentially constant and equals the curvature along the carrier line in the transition zone at the second boundary line.

3. The method of claim 1, wherein the desired constant curvature gradient is set based on the curvature of the prescription zone at the first boundary line and a boundary condition for the curvature within the transition zone.

4. The method of claim 3, wherein the curvature gradient is further set based on a desired thickness reduction of the ophthalmic lens along the carrier line.

5. The method of claim 1, wherein the desired constant curvature gradient is set based on the curvature of the prescription zone at the first boundary line and a curvature target to be reached at the second boundary line, and wherein the curvature target is at least one of zero and a curvature of the front surface.

6. The method of claim 5, wherein the curvature of the front surface is determined in the same coordinate system as the curvature of the back surface.

7. The method of claim 5, wherein the front surface is a spherical surface.

8. The method of claim 1, wherein the curvature gradient is set to be negative in case the ophthalmic lens is a minus lens and the curvature gradient is set to be positive in case the ophthalmic lens is a plus lens.

9. The method of claim 1, wherein the curvature profile is determined by determining a cubic spline from the first boundary line to the second boundary line, wherein the cubic spline is comprised of a plurality of sections each described by a cubic polynomial, and wherein the cubical polynomials are determined section-wise from the first boundary line to the second boundary line.

10. A method for manufacturing an ophthalmic lens, wherein the ophthalmic lens comprises a shape determined by:
   a) providing a predetermined lens shape of an ophthalmic lens having a front surface and a back surface, wherein the predetermined lens shape comprises a predetermined shape of the front surface and a predetermined shape of the back surface within a prescription zone of the back surface bordered by a first boundary line, such that the ophthalmic lens satisfies predetermined optical properties within the prescription zone;
   b) determining a carrier point on the back surface within the prescription zone and a plurality of carrier lines each extending from the carrier point into a respective direction;
   c) determining a transition zone of the back surface, wherein the transition zone extends radially outwards from the first boundary line towards the outer edge of the ophthalmic lens and ends at a second boundary line bordering the transition zone radially outwards;
   d) for each carrier line, setting a desired constant curvature gradient over the transition zone:
   e) for each carrier line, determining a curvature profile of the back surface between the first boundary line and an outer edge the ophthalmic lens along the carrier line, and wherein the curvature profile in the transition zone is determined based on the respective desired constant curvature gradient f) angular smoothing the back surface radially outwards of the first boundary line; and g) manufacturing the ophthalmic lens comprising the shape defined by steps a) through f), wherein the curvature profile is determined by determining a cubic spline from the first boundary line to the second boundary line, wherein the cubic spline is comprised of a plurality of sections each described by a cubic polynomial, and wherein the cubical polynomials are determined section-wise from the first boundary line to the second boundary line, and wherein the cubical polynomials are determined section-wise from the first boundary line to the second boundary line such that a sagittal height, a slope and a curvature of the back surface along the carrier line are continuous and the curvature along the carrier line changes over each section resulting in an approximated constant curvature gradient over the transition zone.

11. A method for manufacturing an ophthalmic lens, wherein the ophthalmic lens comprises a shape determined by:

a) providing a predetermined lens shape of an ophthalmic lens having a front surface and a back surface, wherein the predetermined lens shape comprises a predetermined shape of the front surface and a predetermined shape of the back surface within a prescription zone of the back surface bordered by a first boundary line, such that the ophthalmic lens satisfies predetermined optical properties within the prescription zone;

b) determining a carrier point on the back surface within the prescription zone and a plurality of carrier lines each extending from the carrier point into a respective direction;

c) determining a transition zone of the back surface, wherein the transition zone extends radially outwards from the first boundary line towards the outer edge of the ophthalmic lens and ends at a second boundary line bordering the transition zone radially outwards;

d) for each carrier line, setting a desired constant curvature gradient over the transition zone;

e) for each carrier line, determining a curvature profile of the back surface between the first boundary line and an outer edge the ophthalmic lens along the carrier line, and wherein the curvature profile in the transition zone is determined based on the respective desired constant curvature gradient;

f) angular smoothing the back surface radially outwards of the first boundary line; and g) manufacturing the ophthalmic lens comprising the shape defined by steps a) through f, wherein the curvature profile is determined by determining a cubic spline from the first boundary line to the second boundary line, wherein the cubic spline is comprised of a plurality of sections each described by a cubical polynomial, and wherein the cubical polynomials are determined section-wise from the first boundary line to the second boundary line such that a sagittal height, a slope and a curvature of the back surface along the carrier line are continuous and the curvature gradient is reset to the desired constant curvature gradient for each polynomial at the radially inwards end of each section.

12. The method of claim 1, wherein a length of the transition zone along each carrier line is constant resulting in the second boundary line bordering the transition zone radially outwards and the second boundary line being radially offset from the first boundary line by the length.

13. The method of claim 8, wherein the length of the transition zone is within a range of at least 10 mm up to and including 20 mm.

14. The method of claim 1, wherein the constant curvature gradient has a magnitude in range from and including 0.05 diopters/mm to and including 1.5 diopters/mm.

15. The method of claim 9, wherein the length of each section is within a range of at least 0.5 mm up to and including 2 mm.

16. The method of claim 1, wherein the method comprises a further step of checking, for each carrier line, whether a thickness of the spectacle lens at an outer edge and/or at an intended frame line along which the ophthalmic lens is to be edged is above a predefined threshold and, if not, reducing or increasing the magnitude of the desired constant curvature gradient.

17. The method of claim 1, wherein the ophthalmic lens is an uncut finished spectacle lens.

18. The method of claim 1, wherein a curvature profile of the predetermined lens shape of the back surface is preserved within the first boundary line.

19. The method of claim 1, wherein at least a sagittal height of the prescription zone of the back surface transitions continuously at the first boundary line into each carrier line.

20. The method of claim 19, wherein further a slope of the prescription zone of the back surface in the direction along the carrier lines transitions continuously at the first boundary line into each carrier line.

21. The method of claim 20, wherein further a curvature of the prescription zone of the back surface in the direction along the carrier lines transitions continuously at the first boundary line into each carrier line.

22. The method of claim 12, wherein the length is to be measured within a plane parallel to a tangential plane oriented tangentially to the carrier point of the back surface.

23. The method of claim 1, wherein the carrier point is offset nasally from a prism reference point of the ophthalmic lens.

24. The method of claim 1, wherein first boundary line is circular and the second boundary line is circular.

25. The method of claim 1, wherein the curvature profile along each carrier line radially outwards of the second boundary line is determined via a circular arc.

26. The method of claim 1, wherein a further step of angular smoothing of the back surface radially outwards of the first boundary line is conducted by flattening a profile of the curvature of the prescription zone in the direction of the carrier lines along the first boundary line via approximation by a polynomial or a spline function or a Fourier series to obtain a flattened curvature profile, and wherein the flattened curvature profile is used as a radially inward starting curvature value for each carrier line.

27. The method of claim 1, wherein the method further comprises the following steps to provide for angular smoothing of the back surface radially outwards of the first boundary line:

i) forming a series of coefficient values of corresponding coefficients of a respective function describing each carrier line in the transition zone; and, ii) determining, for each corresponding coefficient, a first Fourier series of a first order approximating the series of coefficient values, to obtain a first set of Fourier series each dependent on an angle around the carrier point, the first set of Fourier series describing any carrier line in a radial direction for a given angle.

28. The method of claim 27 further comprising the steps of:
   iii) determining, for each coefficient, a second Fourier series of a second order approximating the series of coefficient values, to obtain a second set of Fourier series each dependent on an angle around the carrier point, the second set of Fourier series describing any carrier line in a radial direction for the given angle, wherein the second order is higher than the first order, and wherein the second set of Fourier series is applied at the first boundary line; and,
   iv) blending the second set of Fourier series into the first set of Fourier series radially outwards over a blending zone.

29. The method of claim 28, wherein the step of blending is conducted via the following formula:

$$Z = Z_2(A,R) + W(R) \cdot (Z_1(A,R) - Z_2(A,R)),$$

wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle and the radial distance based on the second set of Fourier series, and wherein W(R) is a quintic blending polynomial.

30. The method of claim 29, wherein $$W(R) = 10 \cdot t^3 - 15 \cdot t^4 + 6 \cdot t^5,$$

wherein $$t = \frac{(R - RD)}{\text{delta}},$$

wherein RD is the radial distance between the first boundary line and the carrier point at the angle A, and wherein delta is the width of the blending zone.

31. The method of claim 30, wherein delta is 0.6 times the radial distance between the first boundary line and the carrier point at the angle A.

32. A method for manufacturing an ophthalmic lens, wherein the ophthalmic lens comprises a shape defined by a surface determined by carrier lines extending radially outwards of a prescription zone, the method comprising the following steps:
   aa) providing a plurality of carrier lines each extending from a carrier point in the prescription zone into a respective direction, wherein a curvature profile of the surface along each carrier line radially outwards of the prescription zone is provided by a cubic spline;
   bb) forming a first set of truncated Fourier series of a definite high order each approximating corresponding coefficients of a first spline for all carrier line directions,
   cc) forming a second set of truncated Fourier series of a definite low order each approximating corresponding coefficients of a second spline for all carrier line directions,
   dd) determining a third spline sufficient to determine a surface height at any radial location within the range of the carrier lines for any specified carrier line direction by a weighted average of the first spline and second spline for that direction, where the weighting function is a polynomial function of the radial distance from the first boundary, and
   ee) manufacturing the ophthalmic lens comprising the shape defined by steps aa) through dd).

33. A method for manufacturing an ophthalmic lens, wherein the ophthalmic lens comprises a shape defined by a surface determined by carrier lines extending radially outwards of a prescription zone bordered by a first boundary line, the method comprising the following steps:
   i) providing a plurality of carrier lines each extending from a carrier point in the prescription zone into a respective direction, wherein a curvature profile of the surface in a direction along each carrier line extending radially outwards of the prescription zone has at least one section, wherein the curvature profiles of corresponding sections of each carrier line are provided by respective polynomials,
   ii) forming a series of coefficient values of corresponding coefficients of the polynomials of each carrier line,
   iii) determining, for each corresponding coefficient, a first Fourier series of a first order approximating the series of coefficient values, to obtain a first set of Fourier series each dependent on an angle around the carrier point,
   iv) determining, for each coefficient, a second Fourier series of a second order approximating the series of coefficient values, to obtain a second set of Fourier series each dependent on an angle around the carrier point, the second set of Fourier series describing any carrier line extending in a radial direction for a given angle, wherein the second order is higher than the first order, and wherein the second set of Fourier series is applied at the first boundary line,
   v) blending the second set of Fourier series into the first set of Fourier series radially outwards over a blending zone, and
   vi) manufacturing the ophthalmic lens comprising the shape defined by steps i) through v).

34. A method for manufacturing an ophthalmic lens, wherein the ophthalmic lens comprises a shape defined by a surface determined by carrier lines extending radially outwards of a prescription zone bordered by a first boundary line, the method comprising:
   i) providing a plurality of carrier lines each extending from a carrier point in the prescription zone into a respective direction, wherein a curvature profile of the surface in a direction along each carrier line extending radially outwards of the prescription zone has at least one section, wherein the curvature profiles of corresponding sections of each carrier line are provided by respective polynomials,
   ii) forming a series of coefficient values of corresponding coefficients of the polynomials of each carrier line,
   iii) determining, for each corresponding coefficient, a first Fourier series of a first order approximating the series of coefficient values, to obtain a first set of Fourier series each dependent on an angle around the carrier point,
   iv) determining, for each coefficient, a second Fourier series of a second order approximating the series of coefficient values, to obtain a second set of Fourier series each dependent on an angle around the carrier point, the second set of Fourier series describing any carrier line extending in a radial direction for a given angle, wherein the second order is higher than the first order, and wherein the second set of Fourier series is applied at the first boundary line v) blending the second set of Fourier series into the first set of Fourier series radially outwards over a blending zone, and vi) manufacturing the ophthalmic lens comprising the shape defined by steps i) through v), wherein the step of blending is conducted via the following formula:

$$Z=Z_2(A,R)+W(R)\cdot(Z_1(A,R)-Z_2(A,R)),$$

wherein Z is the resulting sagittal height, A is the angle around the carrier point, R is the radial distance from the carrier point, $Z_1(A,R)$ is the sagittal height at the angle A and the radial distance R based on the first set of Fourier series, and $Z_2(A,R)$ is the sagittal height at the angle A and the radial distance R based on the second set of Fourier series, and wherein W(R) is a quintic blending polynomial.

35. The method of claim 34, wherein $$W(R)=10\cdot t^3-15\cdot t^4+6\cdot t^5,$$

wherein $$t=\frac{(R-RD)}{\text{delta}},$$

wherein RD is the radial distance between the first boundary line and the carrier point at the angle A, and wherein delta is the width of the blending zone.

36. The method of claim 35, wherein delta is 0.6 times radial distance between the first boundary line and the carrier point at the angle A.

37. A non-transitory computer program product comprising program code for carrying out the steps of a method for providing a lens shape for an ophthalmic lens, when the computer program product is run on a data processing device, the method for providing comprising the steps of:

providing a predetermined lens shape of an ophthalmic lens having a front surface and a back surface, wherein the predetermined lens shape comprises a predetermined shape of the front surface and a predetermined shape of the back surface within a prescription zone of the back surface bordered by a first boundary line, such that the ophthalmic lens satisfies predetermined optical properties within the prescription zone;

determining a carrier point on the back surface within the prescription zone and a plurality of carrier lines each extending from the carrier point into a respective direction;

determining a transition zone of the back surface, wherein the transition zone extends radially outwards from the first boundary line towards the outer edge of the ophthalmic lens and ends at a second boundary line bordering the transition zone radially outwards;

for each carrier line, setting a desired constant curvature gradient over the transition zone;

for each carrier line, determining a curvature profile of the back surface between the first boundary line and an outer edge the ophthalmic lens along the carrier line, wherein the curvature profile in the transition zone is determined based on the respective desired constant curvature gradient; and angular smoothing of the back surface radially outwards of the first boundary line.

38. A non-transitory computer program product comprising program code for carrying out the steps of a method for constructing a surface determined by carrier lines extending radially outwards of a prescription zone, when the computer program product is run on a data processing device, the method for constructing comprising:

providing a plurality of carrier lines each extending from a carrier point in the prescription zone into a respective direction, wherein a curvature profile of the surface along each carrier line extending radially outwards of the prescription zone is provided by a cubic spline;

forming a first set of truncated Fourier series of a definite high order each approximating corresponding coefficients of a first spline for all carrier line directions;

forming a second set of truncated Fourier series of a definite low order each approximating corresponding coefficients of a second spline for all carrier line directions;

determining a third spline sufficient to determine a surface height at any radial location within the range of the carrier lines for any specified carrier line direction by a weighted average of the first spline and second spline for that direction, where the weighting function is a polynomial function of the radial distance from a first boundary line; and manufacturing the ophthalmic lens according to the lens shape.

39. A non-transitory computer program product comprising program code for carrying out the steps of a method for providing a surface determined by carrier lines extending radially outwards of a prescription zone bordered by a first boundary line, when the computer program product is run on a data processing device, the method comprising:

providing a plurality of carrier lines each extending from a carrier point in the prescription zone into a respective direction, wherein a curvature profile of the surface in a direction along each carrier line extending radially outwards of the prescription zone has at least one section, wherein the curvature profiles of corresponding sections of each carrier line are provided by respective polynomials;

forming a series of coefficient values of corresponding coefficients of the polynomials of each carrier line;

determining, for each corresponding coefficient, a first Fourier series of a first order approximating the series of coefficient values, to obtain a first set of Fourier series each dependent on an angle around the carrier point;

determining, for each coefficient, a second Fourier series of a second order approximating the series of coefficient values, to obtain a second set of Fourier series each dependent on an angle around the carrier point, the second set of Fourier series describing any carrier line extending in a radial direction for a given angle, wherein the second order is higher than the first order, and wherein the second set of Fourier series is applied at the first boundary line;

blending the second set of Fourier series into the first set of Fourier series radially outwards over a blending zone; and manufacturing the ophthalmic lens according to the lens shape.

\* \* \* \* \*

UNITED STATES PATENT AND TRADEMARK OFFICE
CERTIFICATE OF CORRECTION

PATENT NO. : 10,782,541 B2
APPLICATION NO. : 15/056792
DATED : September 22, 2020
INVENTOR(S) : Ray Steven Spratt et al.

It is certified that error appears in the above-identified patent and that said Letters Patent is hereby corrected as shown below:

In the Claims

Column 35, Line 3, Claim 10, change "gradiant" to -- gradiant; --.

Column 35, Line 46, Claim 11, change "edge" to -- edge of --.

Column 38, Line 67, Claim 34, change "line" to -- line, --.

Column 39, Line 30, Claim 36, change "radial" to -- the radial --.

Column 39, Line 58, Claim 37, change "edge" to -- edge of --.

Signed and Sealed this
Twenty-second Day of December, 2020

Andrei Iancu
*Director of the United States Patent and Trademark Office*